United States Patent
Deng et al.

(10) Patent No.: US 9,571,809 B2
(45) Date of Patent: Feb. 14, 2017

(54) SIMPLIFIED DEPTH CODING WITH MODIFIED INTRA-CODING FOR 3D VIDEO CODING

(71) Applicant: Intel Corporation, Santa Clara, CA (US)

(72) Inventors: Zhipin Deng, Beijing (CN); Yi-Jen Chiu, San Jose, CA (US); Lidong Xu, Beijing (CN); Wenhao Zhang, Beijing (CN); Yu Han, Beijing (CN); Xiaoxia Cai, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 14/129,455

(22) PCT Filed: Aug. 21, 2013

(86) PCT No.: PCT/US2013/055919
§ 371 (c)(1),
(2) Date: Dec. 26, 2013

(87) PCT Pub. No.: WO2014/168642
PCT Pub. Date: Oct. 16, 2014

(65) Prior Publication Data
US 2014/0307786 A1    Oct. 16, 2014

Related U.S. Application Data

(60) Provisional application No. 61/811,257, filed on Apr. 12, 2013, provisional application No. 61/811,214, filed on Apr. 12, 2013.

(51) Int. Cl.
*H04N 19/597* (2014.01)
*H04N 13/00* (2006.01)

(52) U.S. Cl.
CPC ...... *H04N 13/0007* (2013.01); *H04N 13/0048* (2013.01); *H04N 19/597* (2014.11)

(58) Field of Classification Search
CPC .............. H04N 13/0007; H04N 19/597; H04N 13/0048
See application file for complete search history.

(56) References Cited

U.S. PATENT DOCUMENTS

2012/0050495 A1    3/2012  Chen et al.
2012/0229602 A1    9/2012  Chen et al.
(Continued)

FOREIGN PATENT DOCUMENTS

KR    10-2011-0036401 A    4/2011
KR    10-2013-0002297 A    1/2013
(Continued)

OTHER PUBLICATIONS

Jager, "Simplified Depth Map Intra Coding with an Optional Depth Lookup Table," International Conference on 3D Imaging (IC3D), IEEE, 2012.*

(Continued)

*Primary Examiner* — Thai Tran
*Assistant Examiner* — Christopher T Braniff
(74) *Attorney, Agent, or Firm* — Green, Howard & Mughal, LLP

(57) ABSTRACT

Systems, mediums, and methods for simplified depth coding for 3D video coding comprises performing modified intra DC coding or modified intra planar coding of at least one coding unit associated with a plurality of pixels and of at least one depth map, and comprising forming a prediction value of the at least one coding unit.

18 Claims, 12 Drawing Sheets

(56) References Cited

U.S. PATENT DOCUMENTS

2013/0022111 A1 1/2013 Chen et al.
2013/0272405 A1 10/2013 Joon et al.
2014/0184744 A1* 7/2014 Liu .................. H04N 19/597
348/43

FOREIGN PATENT DOCUMENTS

| WO | 2012087034 | | 6/2012 |
|----|------------|---|--------|
| WO | 2013/032423 | A1 | 3/2013 |
| WO | 2014/168642 | A1 | 10/2014 |

OTHER PUBLICATIONS

International Report on Patentability for PCT/US2013/055919, mailed Oct. 22, 2015, 7 pages.
Deng et al., "3D-CE6-related: Cleanup for 64×64 SDC," Joint Collaborative Team on 3D Video Coding Extensions of ITU-T SG 16 WP 3 and ISO/IEC JTC 1/SC 29/WG 11, Apr. 2013, 6 pages.
Jager, Fabian, "Simplified Depth Map Intra Coding with an optional Depth Lookup Table", Oct. 13-19, 2012, 4 pages.
Jager et al., "Model-based Intra Coding for Depth Maps in 3D Video Using a Depth Lookup Table", 3DTV-conference: The True Vision—Capture, Transmission and Display of3D Video (3DTV-CON), IEEE, Oct. 15-17, 2012, pp. 1-4.
International Search Report and Written Opinion received for PCT Patent Application No. PCT/US2013/055919, mailed on Jan. 16, 2014, 11 pages.
Extended Search Report, mailed Aug. 9, 2016, for European Patent Application No. 13881785.3.
Zheng, X. et al., "CE6.H related: Reference samples sub-sampling for SDC and DMM", JCT-3V Meeting 103. MPEG Meeting Jan. 17-23, 2013, Geneva; The Joint Collaborative Team on 3D Video Coding Extension Develompment of ISO/IEC JTC1/SC29/WG11 and ITU-T SG. 16. http://phenix.int-evry.fr/jct2. No. JCT3V-C0154. Jan. 11, 2013. XP030130570.
Office Action, mailed Nov. 25, 2016, for Russian Patent Application No. 2015138910.

* cited by examiner

SIMPLIFIED DEPTH CODING WITH MODIFIED INTRA-CODING FOR 3D VIDEO CODING

CROSS-REFERENCE TO RELATED APPLICATIONS

This application claims the benefit of U.S. Provisional Application No. 61/811,257, filed Apr. 12, 2013, and the benefit of U.S. Provisional Application No. 61/811,214, filed Apr. 12, 2013, both of which are incorporated herein for all purposes.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). Similar to previous video coding standards, HEVC includes basic functional modules such as intra/inter prediction, transform, quantization, in-loop filtering, and entropy coding. HEVC codec processes and compresses a picture by partitioning it into multiple non-overlapped blocks, which are denoted as coding units (CUs). A coding unit contains a square block of luma pixels and two corresponding blocks of chroma pixels. The size of a coding unit can be configured to be 8×8, 16×16, 32×32 or 64×64 in luma component.

Based on the HEVC standard, the study of Three Dimensional Video Coding extension of HEVC (3D-HEVC) is currently on-going by the Joint Collaborative Team on 3D Video Coding (JCT-3V) formed by ISO/IEC Moving Picture Experts Group (MPEG) and ITU-T Video Coding Experts Group (VCEG). In 3D-HEVC, multiview video plus depth (MVD) coding concept is used to represent the 3D video content, in which a limited number of texture views and associated depth maps are coded and multiplexed into a bitstream.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
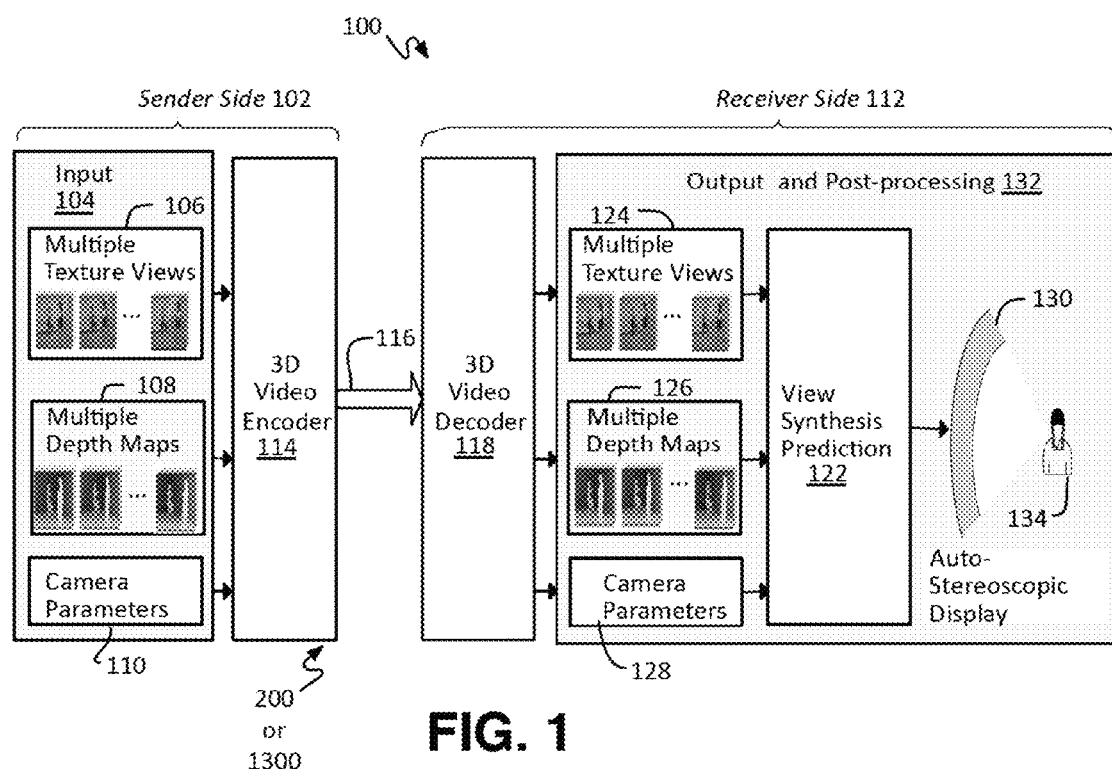
FIG. 1 is an illustrative diagram of a 3D video content system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation" "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

As used herein, the term "coder" may refer to an encoder and/or a decoder. Similarly, as used herein, the term "coding" may refer to performing video encoding via an encoder and/or performing video decoding via a decoder. For example a video encoder and video decoder may both be examples of coders capable of coding video data. Further, an encoder may have components for decoding, and a decoder may have components for encoding. In addition, as used herein, the term "codec" may refer to any process, program or set of operations, such as, for example, any combination of software, firmware, and/or hardware, that may implement an encoder and/or a decoder. Further, as used herein, the phrase "motion data" may refer to any type of data associated with inter prediction including, but not limited to, one or more motion vectors, reference indices, and/or inter directions.

Systems, articles, and methods are described below related to simplified depth coding with modified intra-coding for 3D video coding as described herein.

As noted previously, in 3D high efficiency video coding (3D-HEVC), multiview video plus depth (MVD) coding is used to represent the 3D video content, in which a limited number of texture views and associated depth maps are coded and multiplexed into a bitstream. HEVC provides partitioning of images into coding units of 8×8, 16×16, 32×32 or 64×64 (measured in pixels). Simplified depth coding (SDC) for intra-coding of the coding units includes at least three different types of coding modes: Infra_DC (where DC stands for depth coding), Intra_Planar, and Intra_DMM (where DMM stands for Depth Modeling Mode). Intra_DC uses values of neighboring pixels on neighboring coding units along the sides of the current coding unit to predict values of pixels within the current coding unit. Planar prediction may use neighboring pixels both along the sides of the current coding unit and outside of corners of the current coding unit to predict values within the coding unit. DMM divides the coding unit by a line from edge to edge of the coding unit into wedgelets (or alternatively contours when the lines are not straight) and each wedgelet is coded separately. For both intra_DC and intra_planar coding of SDC approach, the algorithms used are complex and computation heavy resulting in slower coding and/or heavy calculation loads on the hardware performing the calculations. This results in greater power consumption to perform the coding. Details are provided below for reducing the power consumption in order to provide greater hardware capacity and/or to enable efficient coding with hardware with relatively low capacity. This is accomplished by modifying the intra_DC coding and/or intra_planar coding to provide a prediction value on a coding unit basis rather than a pixel basis as explained below. This may result in a trade off with a slight reduction in accuracy, which may be undetectable by a user, for a significant reduction in power consumption.

It will be understood that intra coding with or without the underscore and/or hyphen (infra_DC versus intra-DC or intra DC, for example) all refer to the same process, and no difference is intended by the present disclosure with regard to the process.

Now in more detail and while referring to FIG. 1, a video content system 100 uses 3D-HEVC video coding with Multiview Video plus Depth (MVD) processing to represent the 3D video content. In such a system, the encoder or sender side 102 may receive input data 104 including raw image data from video capture devices, such as video cameras for one non-limiting example. The raw image data may include texture views 106 such as that provided in RGB format or other know formats that provide luminance and chromatic information on a pixel basis, and typically on a sampled basis such as 4:2:0 for HEVC coding, although other sampling ratios also may be used. The texture views 106 may include multiple pictures (or frames) taken from multiple camera positions at a single instant in time. Input data 104 may also include depth maps 108, where each depth map 108 corresponds to a texture view, and includes data on a sampled per pixel basis that indicates the distance of the object in an image from the camera lens, and on a scale such as 1 to 255. In one form, the pixel values on a depth map are luminance values or gray scale values that are darker as the image extends farther away from the camera lens. Camera parameters 110 also may be provided in the input to provide the camera position or angle (for example, the scale and offset) as well as other data for the multiple views of the same time instant.

The input may be provided to a video coding system 200 or 1300 that includes an encoder or other coding device 114 in order to compress and pack the texture views, depth maps, camera parameters, and other data into a bitstream 116 for transmission to a decoder 118 at a receiver side device 120. The decoder 118 demuxes and decompresses the data, and provides the texture views 124, depth maps 126, and camera parameters 128 to a synthesis prediction module 122 in order to create missing views or depth maps, fill in existing views and depth maps with missing pixel information, and/or overwrite pixel information with predicted information of the view and/or depth maps. These may be performed with the use of the camera parameters transmitted in the bitstream or obtained otherwise. Once the images are configured, the images may be displayed on a 3D auto-stereoscopic display 130 with a display screen so that, in one example form, the image changes depending on the angle to, and motion of a user 134 viewing the display screen. It will be understood that some or all of the output and post-processing 132 components may or may not be considered to be part of the decoder 118.

Figure 13A:
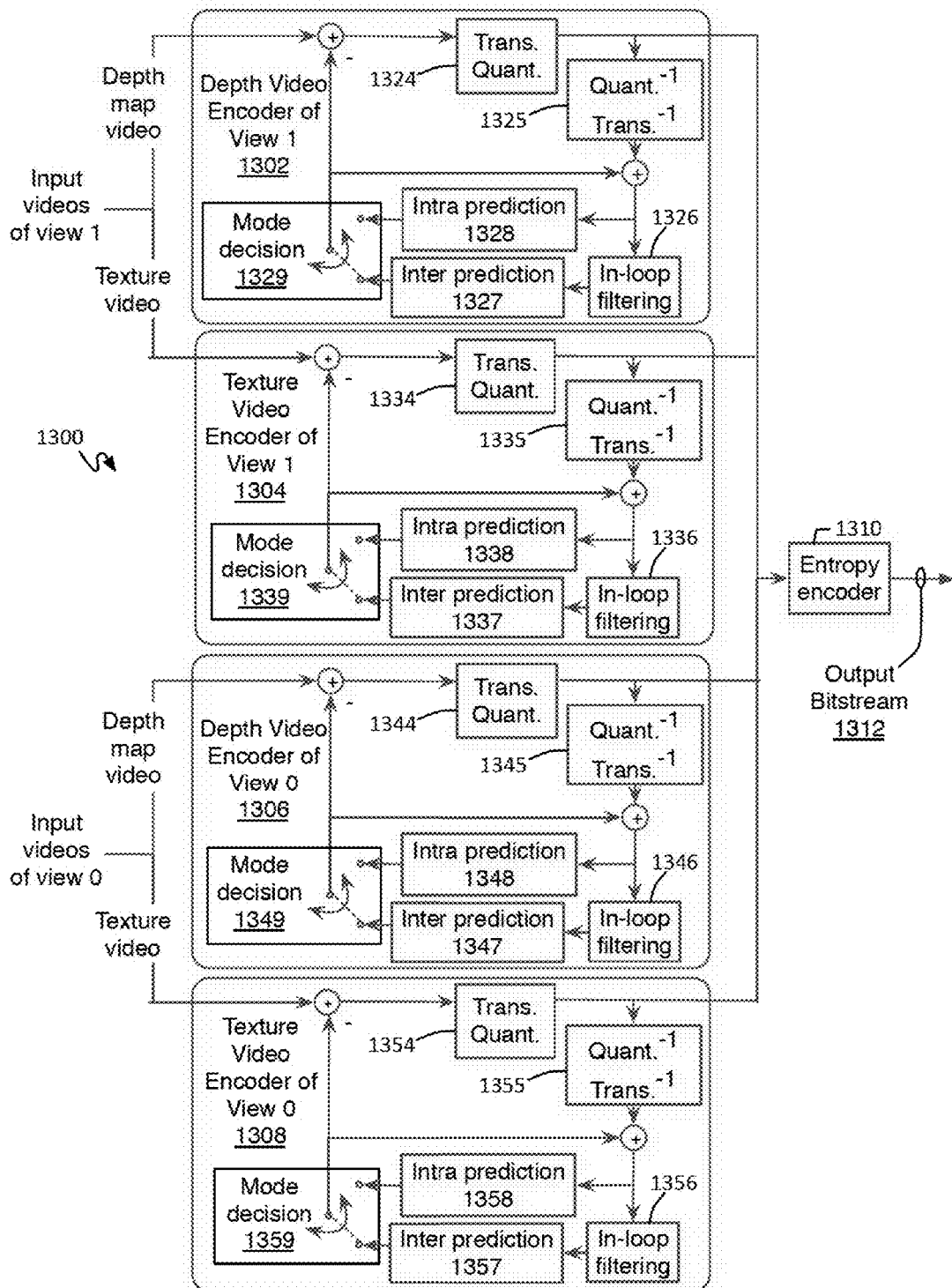
FIG. 13A is an illustrative diagram of a first part of a video coding system.
Figure 13B:
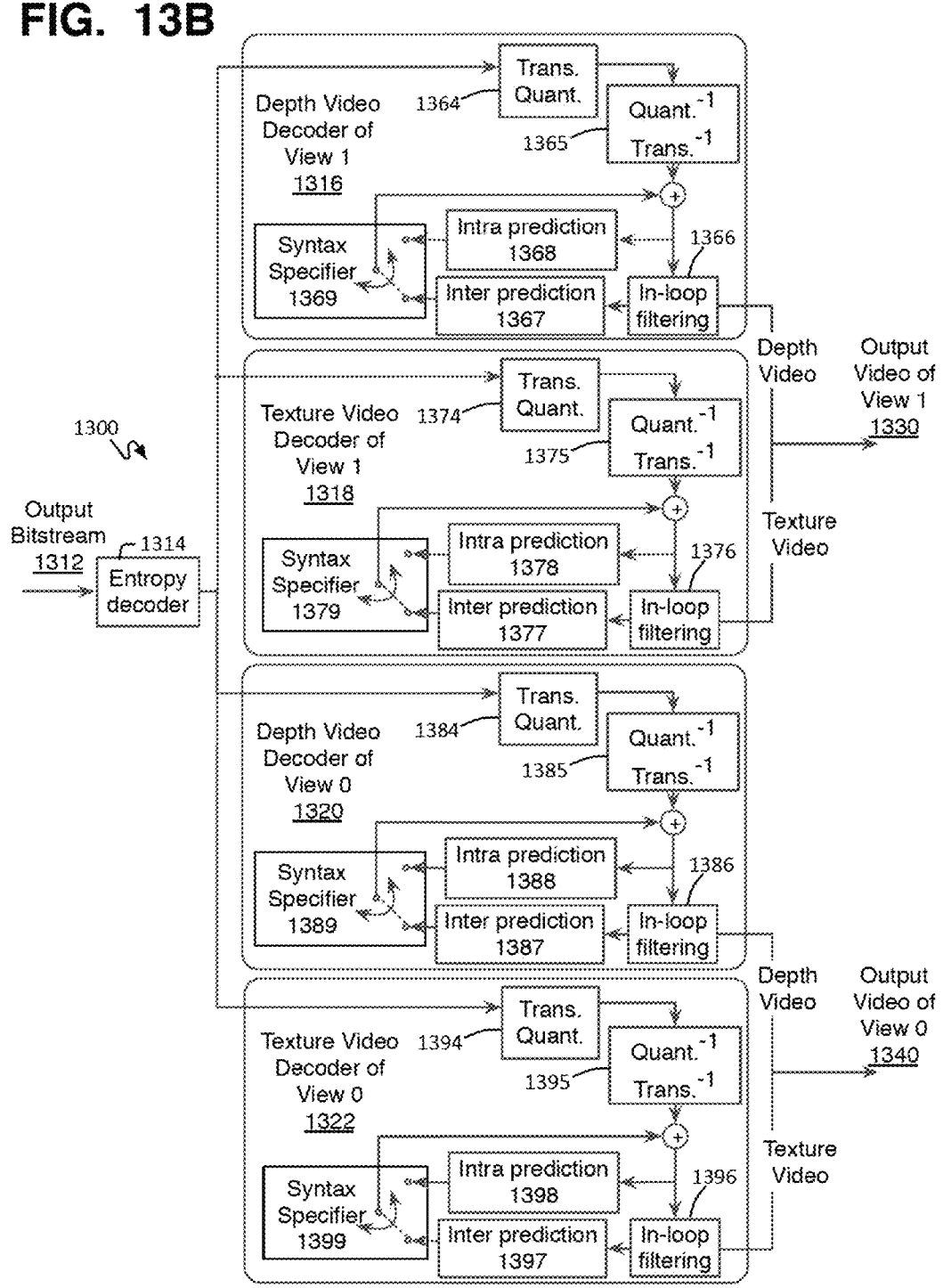
FIG. 13B is an illustrative diagram of a second part of the video coding system of FIG. 13A.

Referring to FIGS. 13A-13B, a video coding system 1300 may be used with the video content system 100. As mentioned above, HEVC may be used as the compression standard such as that described by Recommendation ITU-T H.265 and ISO/IEC 23008-2 MPEG-H, Part 2 (4/2013) (see, ITU-T website www.itu.int/rec/T-REC-H.265-201304-I) and provided by the Joint Collaborative Team on Video Coding (JCT-VC) formed by ISO/IEC Moving Picture Experts Group (MPEG) and ITU-T Video Coding Experts Group (VCEG). Similar to previous video coding standards, HEVC includes basic functional modules such as intra/inter prediction, transform, quantization, in-loop filtering, and entropy coding, as well as other codec processes, and the encoder may include a prediction loop to reconstruct images similar to, or the same as, that performed by the decoder in order to use the reconstructed images as reference images for prediction of further images and formation of prediction residuals to be transmitted to the decoder.

Specifically, for one implementation the video coding system 1300 may be organized mainly by views. Each view may have a texture frame and a corresponding depth map, and for each view at a single point in time. Here only two views are described but there may be more such as five to ten views associated with a single time instance by one example. View 0 may be an independent view, while view 1 and other views represent the dependent views. In this way, view 1 may be coded in 2D while the other views may be separately coded in 3D. The video or image data for the view is divided into texture video data and depth map video data. The depth map video data for view 0 for example is provided to a depth video encoder 1306 while the texture data is provided to a texture video encoder 1308. Similarly, the depth map video data for view 1 may be provided to a depth video encoder 1302 while the texture video data may be provided to a texture video encoder 1304. The depth maps are reconstructed and compressed as well as the textural images, provided to an encoder 1310 and placed in an output bitstream 1312. Output bitstream 1312 is received at a decoder side by an entropy decoder 1314, and the process from above is reversed to decompress the depth map data and textural data for views 1 and 2. This results in a reconstructed 3D output video or frame (or picture or image) for view 1 (1330) obtained from a depth map decoder 1316 and a texture video decoder 1318. View 0 may be similarly decoded at a depth video decoder 1320 and texture video decoder 1322, resulting in an output video frame for view 0 (1340).

Each of the encoders and decoders have the same or similar main components with functional differences explained in more detail with video coding system 200. Here, encoder 1302 of system 1300 may have a transform/quantization module 1324 which provides lossy compressed data to the bitstream. A frame or depth map reconstruction loop for prediction and rebuilding of frames or depth maps may have an inverse quantization/transform module 1326, an in-loop filter 1326, inter-prediction module 1337, intra-prediction module 1328, and mode decision control 1329. Each of the encoders and decoders mentioned have similar components numbered similarly (for example, intra-prediction module 1337 for view 1 may have at least some similar functions to intra-prediction module 1537 for view 0, and so forth).

Figure 2:
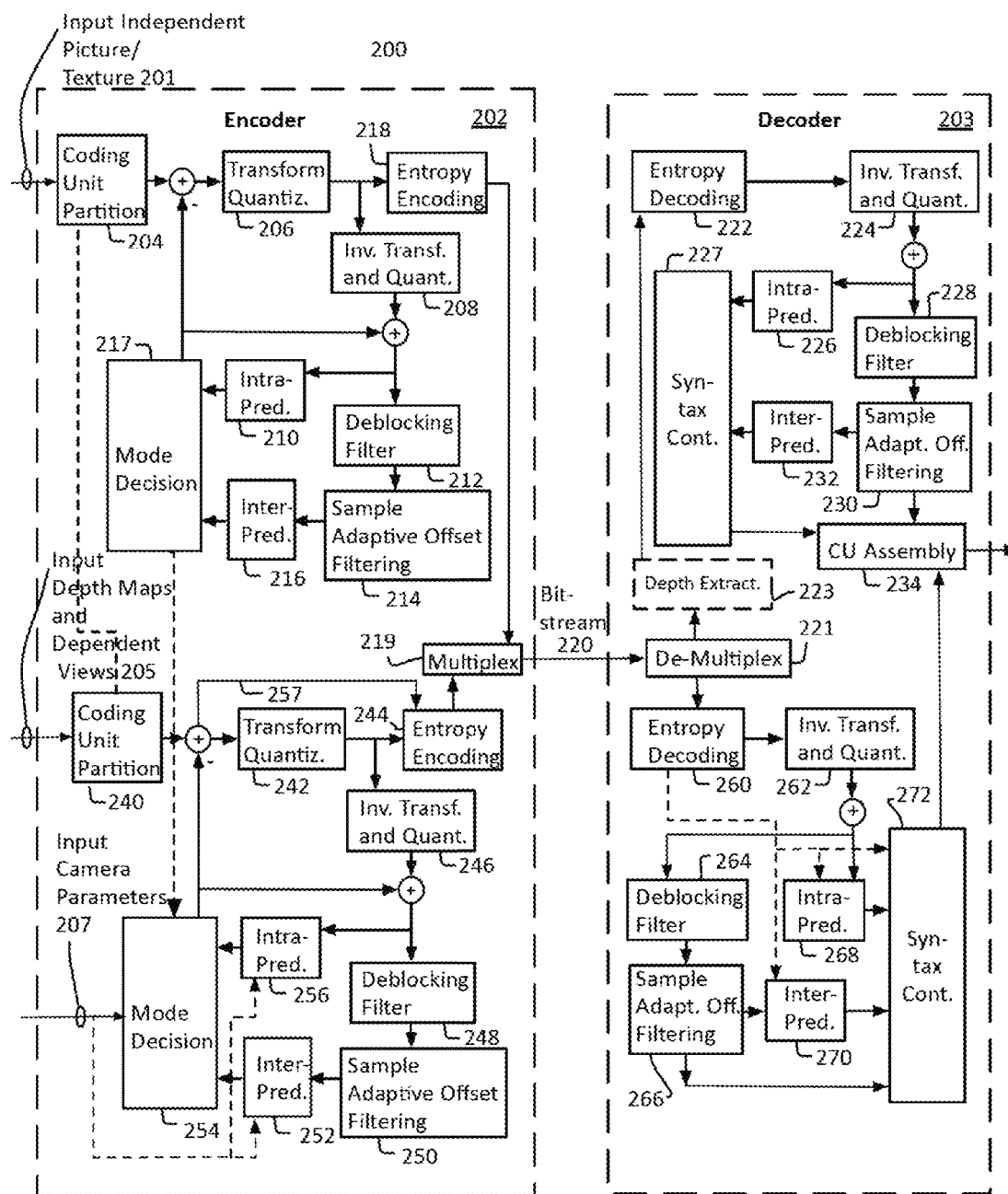
FIG. 2 is an illustrative diagram of a video coding system.

Referring now to FIG. 2, a more detailed video coding system 200 is explained. System 200 may have a 2D side for the main or independent frame (which may also be view 0 for system 1300) that is distinct from a 3D side that receives dependent views, depth map data, and camera parameters, explained in greater detail below. The HEVC standard specifies that a picture may be partitioned into non-overlapping Largest. Coding Units (LCUs) and each LCU may then be partitioned into Coding Units (CUs) that may take the form of rectangular blocks having variable sizes. The present disclosure is directed to systems that use square coding units. Within each LCU, a quad-tree based splitting scheme specifies the coding unit partition pattern. HEVC also defines Prediction Units (PUs) and Transform Units (TUs) that specify how a given coding unit is to be partitioned for prediction and transform purposes, respectively. A texture coding unit ordinarily includes one luma Coding Block (CB) and two chroma CBs together with associated syntax, and a PU may be further divided into Prediction Blocks (PBS) ranging in size from 64×64 samples down to 4×4 samples. As used herein, the term "block" may refer to any partition or sub-partition of a video picture. For example, a block may refer to video data corresponding to an LCU, a PU, a PB, a TU, or a CU.

3D-HEVC with MVD may be configured to permit different types of displays. Thus, while a 3D decoder may make full use of the depth data on the bitstream a stereo video decoder and a 2D decoder may still use the bitstream from the 3D encoder by extracting the unneeded data, such as depth maps, from the bitstream. In order to provide this feature, an independent or base view is coded by using 2D (or regular) video coding. For explanatory purposes, the video coding system 200 shows some of the components used for 2D or regular coding, and another set of components for 3D coding. It will be understood, however, the same component or module may be used to perform similar tasks for both 2D and 3D video coding.

As illustrated, video coding system 200 may include an encoder 202 and a decoder 203. For processing independent pictures 201, a coding unit partition module 204 first partitions the frames or pictures 201 into blocks. For this example, HEVC compresses a picture or texture view by partitioning it into multiple non-overlapped blocks, which are denoted as Coding Units (CUs). A texture view coding unit may contain a square block of 2N×2N luma pixels and two corresponding blocks of Chroma pixels. The size of a coding unit can be configured to be 8×8, 16×16, 32×32 or 64×64 in luma component.

Encoder 202 may then encode input pictures 201 using a coding loop that may include a transform and quantization module 206, an inverse quantization and inverse transform module 208, and, depending on the mode decision implemented by encoder 202 via mode decision module 217, either a first path including an intra-prediction module 210, or a second path including a deblocking filtering module 212, a sample adaptive offset filtering module 214 and an inter prediction module 216 that may include motion estimation and motion compensation features. After transforming and quantization of input pictures 201, encoder 202 may entropy encode the compressed images and prediction residuals using entropy encoding module 218. Finally, encoder 202 may use a multiplexer 219 to add the independent frame data packets to a bitstream 220 that incorporates the coded video data.

Decoder 203 may receive coded video data, and particularly texture data, in the form of bitstream 220. First, the textural and depth map data may be separated from the 2D map data by a demux or de-mutiplex 221. For 2D decoding, the decoder may have a depth data extractor 223 that filters out the depth data from the data stream 220 and provides the remaining data to an entropy decoding module 222 and an inverse quantization and inverse transform module 224. The resulting image data may be placed through a decoding prediction loop employing, depending on the coding mode indicated in syntax of bitstream 220 and implemented via syntax control module 227, either a first path including an intra-prediction module 226 or a second path including a deblocking filtering module 228, a sample adaptive offset filtering module 230, and an inter prediction module 232. Decoder 203 may then employ a coding unit assembling module 234 to generate decoded output pictures, which may be presented to a user via a display, for example.

3D-FIEVC Test Model 3 from JCT-3V-C1005, Geneva, C H, January 2013, incorporated herein in its entirety, provides a protocol for coding of a 3D video bitstream and display of 3D images in a format similar to Multiview Video plus Depth (MVD) coding. To perform the 3D video coding, by one example form, each texture view (hereinafter referred to simply as a view) may have a corresponding depth map for display of the images. The views and depth maps may be organized into access units where each access unit represents all of the views and their corresponding depth maps for a single instant in time. Each view in an access unit may provide an image for a different camera position, and multiple access units may contain views from the same group of camera positions albeit at different points in time. These views may be coded in the same order for multiple or all of the access units although the views may or may not be coded in camera position order from left to right for example. In other words, coded view 1 in an access unit may always be the center view, the next view, view 2, the farthest view to the left, and the next view, view 3, may be the farthest view to the right, and so on. Many examples are possible.

By one approach, the first view coded for each access unit may or may not be the independent view. The independent view is coded using the 2D coding system as described above, for example. The independent views may then be used as reference views to code the dependent views within the same or other access units and the depth map for one or more of the other views. By one approach, the access units may be coded in similar fashion to the I, P, B slice coding used in the 2D coding. In other words, one access unit may be referred to as an instantaneous decoding refresh (IDR) access unit, in which the video pictures and depth maps in this access code do not use any reference views or depth maps outside of the IDR access unit. Such an access unit may be a random access or clean random access (CRA) unit. While an IDR may be limited to mum-coding for all of its views and depth maps, in one form, inter-coding among the views and depth maps within the IDR still may be performed.

In addition to the independent views, for 3D multiview coding, the system 200 may receive raw image data that may include dependent views 205 providing multiple views for a single instant in time as well as camera parameters 207 to provide information on the position of the camera for the disparity among the multiple views in an access unit. The camera parameters also may be provided to the mode decision control 254 as well as the intra and inter prediction modules 252 and 256 to be used for reconstructing textural images using inter-view vector prediction and block-based view synthesis prediction on the encoder or decoder side.

As with 2D coding, the depth encoding side of the system 200 may include coding unit partition 240 to partition dependent views and depth maps into coding units. This may be coordinated with the partitioning of the independent views to ensure the independent view, dependent views, and depth maps for the same coding unit area on an image are the same size. A transform and quantization module 242 may be included as well as a prediction and filter loop with an inverse transformation-quantization 246 module, deblocking filter 248, and sample adaptive offset filter 250 that is communicatively connected to an inter-prediction module 252, which in turn communicates with a mode decision module 254. Alternatively, an intra-prediction module 256 also communicates with the mode decision module 254. The mode decision module 254 receives the view and depth map data, camera parameters, as well as reconstructed independent views from the 2D coding side of the encoder 202. The mode decision module 254 may provide reference frames, motion compensation data, disparity data (motion between views in an access unit), prediction residuals, and so forth back to the transform-quantization module 242 for entropy coding 244 along with the camera parameters, and then placement in the bitstream by a multiplexer 219 along with the 2D independent frames. Alternatively, a bypass 257 is provided for omitting the transform and quantization before entropy encoding, which is used in some circumstances for depth coding residuals and/or motion data for example.

On the decoder side, again, the 3D coding components may be similar to the 2D components with a number of exceptions. As mentioned above, the textural and depth map data may be separated from the 2D map data by a demux or de-mutiplex 221, and then provided to an entropy decoding module 260. The quantized data is then transmitted to the inverse transform/quantization module 262, and in turn filters 264, 266. Non-quantized data, such as camera parameters, disparity or motion vectors, and/or depth coding residuals may be provided directly to the inter-prediction or intra-prediction modules 268, 270 and syntax control 272 that reconstructs multiple views and depth maps. It is noted that the filters used for textural coding may not be used for depth map coding. The views and depth maps along with the independent views from the 2D side of the decoder are provided to a coding unit assembly 234 for output and display of images or storage.

The 3D-HEVC MVD coding provides many different ways for prediction and reconstructing the multiple views and depth modes. Inter-prediction (or temporal prediction) for coding of dependent views may be performed, for one non-limiting example, by motion-compensated prediction (MCP) that uses the same previously coded view (same camera position) from different access units, or disparity-compensated prediction (DCP) which uses already coded views from the same access unit. Inter-view prediction for texture, motion prediction, and corresponding residual prediction may use combinations of reference views, intra-prediction, and disparity vectors obtained from depth maps. Inter-prediction also may include using the view (texture) as a reference for its depth map, called motion parameter inheritance or depth quadtree prediction.

Intra-coding (spatial prediction) is also used for reconstructing depth maps. Intra-prediction may be used on any view or depth map whether in the textural or depth domains, and whether alone or in conjunction with inter-prediction with the use of reference views or reference depth maps. Intra-prediction may be used on depth maps with missing pixel data, or simply to provide more efficient coding as used herein. Depth map coding also involves both inter-prediction coding using MCP and/or DCP except that interpolation is not used, and full sample accuracy may be used instead.

As mentioned above, one type of intra-coding that may be used for coding depth maps is simplified depth coding (SDC). 3D-HEVC Test Model 3 from JCT-3VC-1005 also specifies a simplified depth coding (SDC) approach for depth map coding of 3D video data. The SDC coding approach is an extension of the intra coding mode. For an SDC-coded block, the prediction mode is still INTRA.

Figure 3:
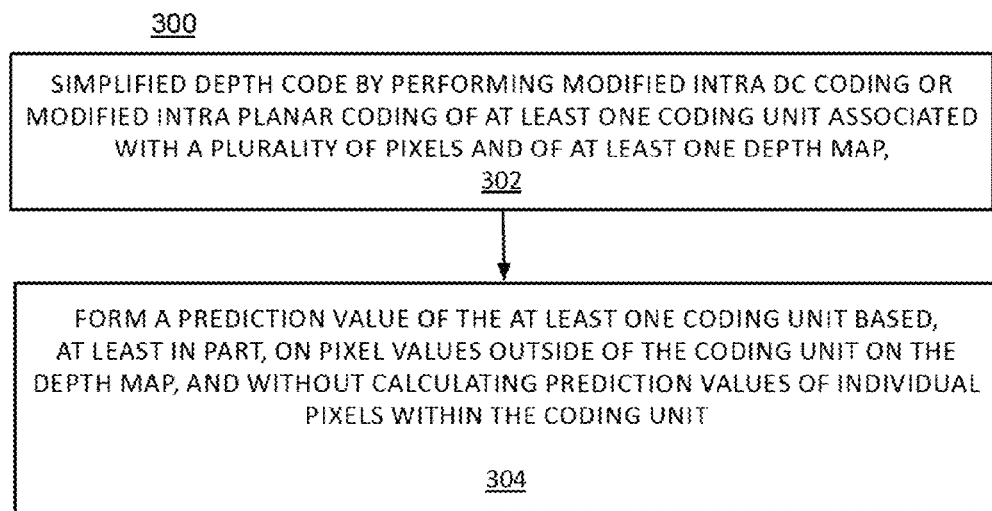
FIG. 3 is a flow chart illustrating an example depth coding process.

Referring to FIG. 3, increased coding efficiency may be provided by performing process 300. Process 300 for a video coding system described herein is arranged in accordance with at least some implementations of the present disclosure. In the illustrated implementation, process 300 may include one or more operations, functions, or actions as illustrated by one or more of operations 302 and/or 304. By way of non-limiting example, process 300 may be described herein with reference to example video coding system of FIG. 1-2 or 13A-13B.

Process 300 may include "SIMPLIFIED DEPTH CODE BY PERFORMING MODIFIED INTRA DC CODING OR MODIFIED INTRA PLANAR CODING OF AT LEAST ONE CODING UNIT ASSOCIATED WITH A PLURALITY OF PIXELS AND OF AT LEAST ONE DEPTH MAP" 302. In other words, modified intra DC coding or modified intra planar coding is performed on at least one coding unit associated with a plurality of pixels and of at least one depth map. Such intra coding may be performed, as explained below, on any coding unit in a depth map that has at least one coding unit to the left and above the current coding unit to be coded.

Process 300 may also include "FORM A PREDICTION VALUE OF THE AT LEAST ONE CODING UNIT BASED, AT LEAST IN PART, ON PIXEL VALUES OUTSIDE OF THE CODING UNIT ON THE DEPTH MAP, AND WITHOUT CALCULATING PREDICTION VALUES OF INDIVIDUAL PIXELS WITHIN THE CODING UNIT" 304. In other words, a prediction value is formed of at least one coding unit based on pixel values outside of the coding unit and without calculating prediction values of individual pixels within the coding unit. As explained further below, currently multiple prediction values are provided for multiple pixels in a coding unit with one prediction value per pixel, and then those prediction values are averaged to obtain the prediction value for a coding unit. The present system is able to eliminate the averaging of prediction values of individual pixels within the coding unit. For intra DC coding, a column and row of pixels adjacent but outside the coding unit are used to obtain the prediction value of the coding unit. For intra planar coding, pixels outside of the corners of the coding unit are used alone or with the pixels used with intra DC coding to obtain the prediction value of the coding unit.

Figure 4:
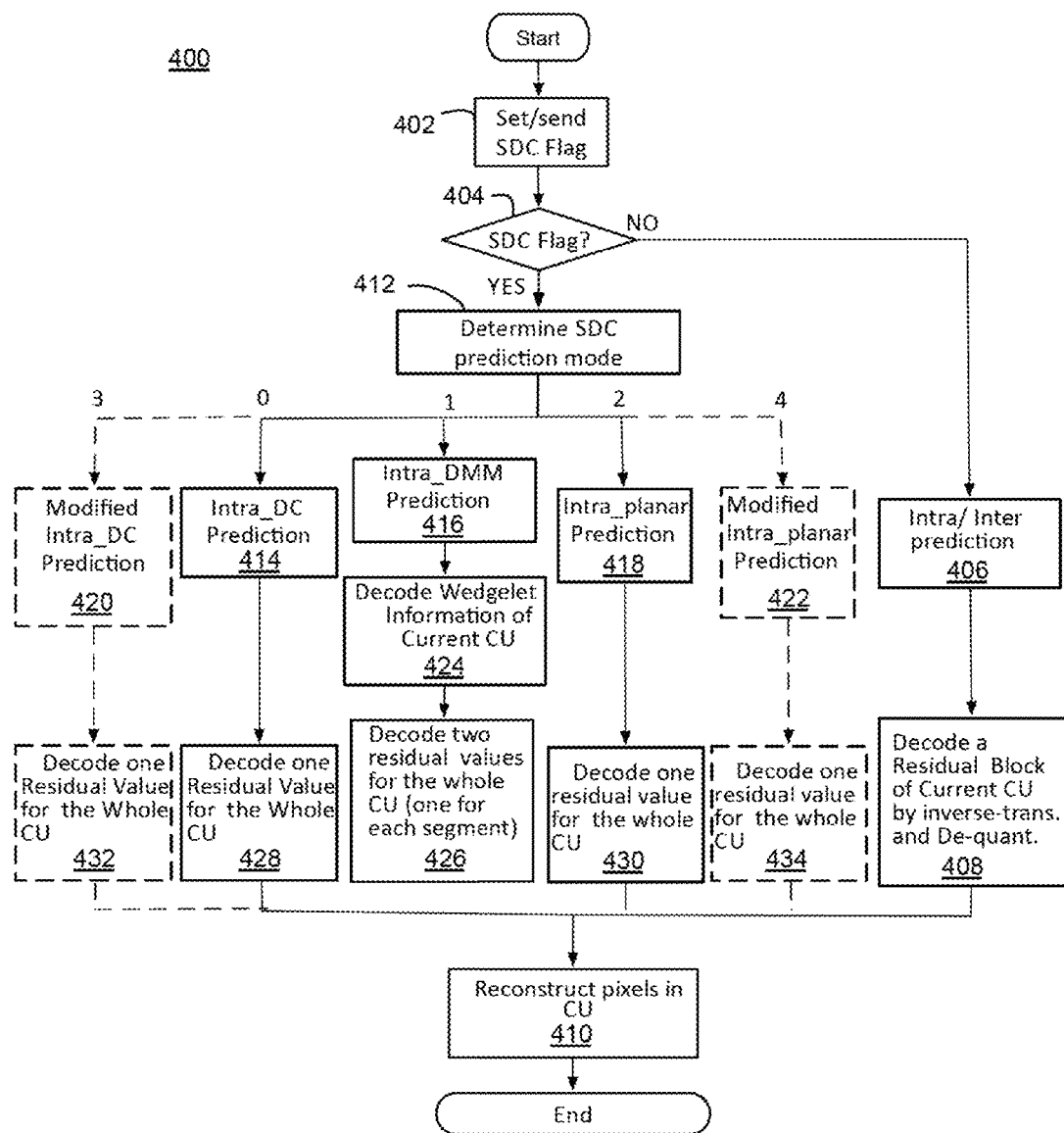
FIG. 4 is a flow chart illustrating another example of a depth coding process.

Referring to FIG. 4, a process 400 is provided for intra coding using simplified depth coding. While the process 400 described below provides the perspective of the decoder side, it will be understood that the operations may be performed at the encoder side and specifically including a prediction loop at the encoder.

A process 400 may include elements used for decoding a SDC-coded coding unit in 3D-HEVC Test Model 3 in HTM6.1 for example, and modified for use with one of the methods described herein. Process 400 for a video coding system described herein is arranged in accordance with at least some implementations of the present disclosure. In the illustrated implementation, process 400 may include one or more operations, functions, or actions as illustrated by one or more of operations 402-434 numbered evenly. By way of non-limiting example, process 400 may be described herein with reference to example video coding system of FIG. 1-2 or 13A-13B.

For simplified depth coding, an additional coding unit level SDC-flag is set or sent 402, and signals the usage of the SDC mode. Thus, an initial operation is to check 404 to see whether the SDC flag is set or sent for a particular coding unit. If no SDC flag is present, then simplified depth coding is skipped for that coding unit, and the process continues with intra/inter coding 406 of the coding unit that may be one of a number of different methods used to obtain a prediction values for the pixels in the coding unit. Inverse transform/quantization 408 is then performed to obtain residual values for the pixels in the coding unit. Then, to reconstruct 410 the pixels in the coding unit depth map, the prediction values are added to the residuals for the individual pixels. This may occur for the coding unit whether at the decoder or within the prediction loop at the encoder.

If the SDC flag is present, then the process determines 414 which SDC prediction mode has been indicated, which may be referred to as SDC_pred_mode for general coding unit syntax. Table 2 below shows one possible correspondence between mode number, binary code, and intra prediction mode.

TABLE 1

| sdc_pred_mode | Binary Code | Associated Intra Prediction Mode |
| --- | --- | --- |
| 0 | 0 | Intra_DC (1 segment) |
| 1 | 1 | Intra_DMM Mode1 (2 segments) |
| 2 | 10 | Intra_Planar (1 segment) |
| 3 | 11 | Modified intra_DC (1 segment) |
| 4 | 100 | Modified intra_planar (1 segment) |

It will be understood that Table 2 merely provides one possible example, and many other orders, mode indicators, and codes may be used to signal a selected or performed intra coding mode.

For this example method, if mode 0 is selected, intra_DC prediction coding is performed 414. If mode 1 is selected, intra_DMM prediction coding is performed 416, and if mode 2 is selected intra_planar prediction coding is performed 418. If mode 3 is selected, modified intra DC coding may be performed, and if mode 4 is selected, modified intra planar coding may be performed. For the illustrated example then, the general syntax may be described as follows. The current coding unit may be coded by an SDC approach where the SDC flag of the current coding unit is set as true, and the possible sdc_pred_mode values ma equal to INTRA_DC, INTRA_PLANAR, INTRA_DMM, INTRA_DC_MOD, or INTRA_PLANAR_MOD (here MOD is short for modified). "_NEW" may also be used instead of "_MOD". Thus, the length of a sdc_pred_mode candidate list could be one, two, three, four, or five options in any combination as long as either INTRA_DC_MOD or INTRA_PLANAR_MOD or both is included. Thus, it will be understood that in other examples, only modified intra DC coding or only intra planar coding may be provided instead of both options. The system may perform what is considered the best option, or it may perform a number of the options and choose the option with the best result.

Then, for the SDC intra DC or intra planar coding 414, 418, 420, 422, a single prediction value is calculated. Two values are obtained for intra DMM coding 416. Also, the residual for an SDC-coded coding unit is not coded as quantized transform coefficients. Instead, one or two constant residual values are signaled. If sdc_pred_mode indicates intra_DC or intra_planar coding is to be used, or was used, then one residual value is transmitted for the whole coding unit. Otherwise, if sdc_pred_mode is intra_DMM, then two residual values are transmitted for the whole coding unit. Thus, for both intra_DC and intra_planar coding, one segment is calculated, and for each resulting segment, a single constant residual value may be signaled in the bitstream and decoded 428, 430, 432, 434 for that coding unit. Otherwise, if sdc_pred_mode is Intra_DMM prediction 416, then the coding unit is partitioned into wedgelets, and in one form two wedgelets, so that each wedgelet has a segment and a resulting residual. Thus, in this case, wedgelet information, such as how to partition the coding unit, may be encoded, transmitted, and decoded 424 so that two residual values may be calculated and decoded 426 for the single (whole) coding unit. The pixels in the coding unit are then reconstructed 410 by adding the prediction value to the corresponding residual. For SDC intra planar and intra DC coding, all of the pixels will have the same reconstructed value since there is only one prediction value and one residual for the coding unit.

Figure 5:
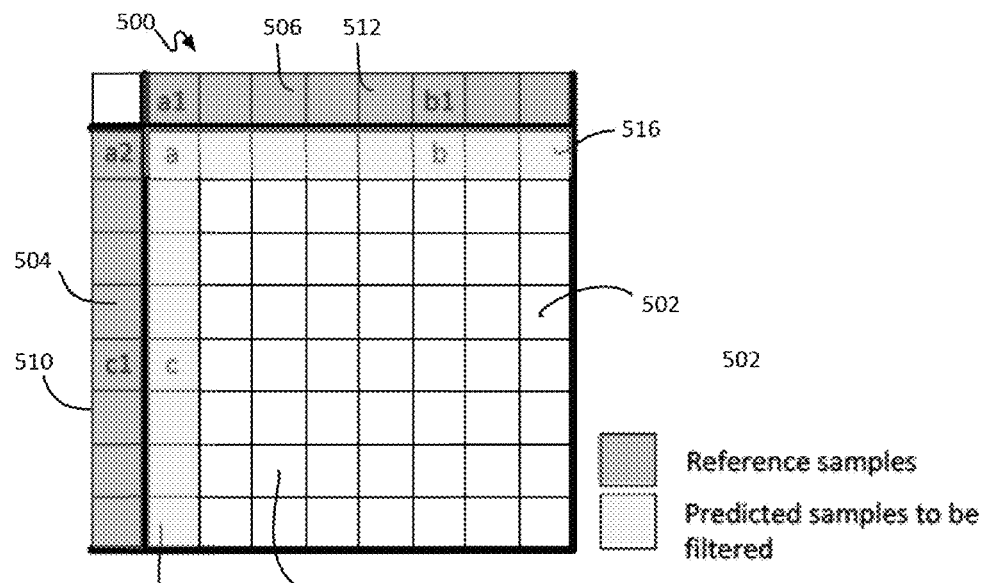
FIG. 5 is an illustrative diagram of coding units to explain intra DC coding.

Referring to FIG. 5, an example depth map 500 is shown to explain non-modified intra DC coding of an SDC-coded coding unit in HTM6.1. As shown, SDC coding may be used on a current coding unit 502 that has a block or partition size set as N×N pixels, and here 8×8. A left coding unit 504 is adjacent a left side of the current coding unit 502, and an upper coding unit 506 is adjacent an upper side of the current coding unit 502. The left coding unit 504 may have a left column 510 of neighboring pixels, and in one example, the left column 510 is adjacent the left side of the current coding unit 502. Similarly, the upper coding unit 506 may have an above row 512 of neighboring pixels, and by one example, adjacent the upper side of the coding unit 502.

Where sdc_pred_mode=intra_DC for example, at the decoder side, a constant prediction value ($Pred_{DC}$) is calculated by averaging the prediction values of all the left and top boundary pixels 514 and 516 in the current SDC-coded coding unit 502. A constant residual value) ($Residual_{DC}$) of the whole SDC-coded coding unit is decoded from the bitstream. Thus, a constant reconstructed value is generated by adding $Pred_{DC}$ to $Residual_{DC}$. Therefore, all the pixels in the whole SDC-coded coding unit use this generated constant reconstructed value as the true reconstructed, final values for each of the pixels in the current SDC-coded coding unit. Thus, this process replaces any original depth value at the pixels 508 in favor of the predicted values.

In more detail, an average prediction value, DCVal, is calculated for each pixel in the current coding unit by rounding up the average value of left column 510 neighboring pixels and above row 512 neighboring pixels.

$$DCVal = \text{Round}\left(\frac{\sum_{x=0}^{N-1} p(x,-1) + \sum_{y=0}^{N-1} p(-1,y)}{2N}\right) \quad (1)$$

$$= \frac{\sum_{x=0}^{N-1} p(x,-1) + \sum_{y=0}^{N-1} p(-1,y) + N}{2N}$$

where Round(●) stands for a rounding up function, N stands for the width and height of the current coding unit, x stands for the horizontal ordinate, y stands for the vertical ordinate, p(x, −1) stands for the values of the above row 512 neighboring pixels at (x, −1), where x=0 . . . N−1, and p(−1, y) stands for the values of the left column 510 neighboring pixels at (−1, y), where y=0 . . . N−1.

Next for non-modified intra DC coding, boundary smoothing is applied on the first column 514 of pixels and the first row 516 of pixels within the current coding unit 502. Assume that "a" stands for the smoothed value of the pixel on the first column 514 and first row 516 of the current coding unit, "a1" stands for the value of a neighboring pixel above "a" and outside the current coding unit 502, "a2" stands for the value of a neighboring pixel on the left of "a" outside the current coding unit 502, "b" stands for the smoothed value of a pixel on the first row 516 of the current coding unit 502, "b1" stands for the value of neighboring pixel above "b" outside the current coding unit 502, "c" stands for the smoothed value of a pixel on the first column 514 of the current coding unit, and "c1" stands for the value of a neighboring pixel on the left of "c" outside the current coding unit 502. The smoothed value of "a", "b", and "c" are calculated by:

$$a = (a1 + 2 * DCVal + a2 + 2) >> 2 \quad (2)$$

$$b = (b1 + 3 * DCVal + 2) >> 2 \quad (3)$$

$$c = (c1 + 3 * DCVal + 2) >> 2 \quad (4)$$

where >>2 refers to a C language bits lift two to the right. This calculation is performed for each of the pixels in the first row 514 and first column 516 within the current coding unit 502, and provides an initial prediction value for individual pixels at the first column 514 and first row 516 within the current coding unit 502.

A constant prediction value $Pred_{DC}$(INTRA_DC), is then calculated for the current coding unit 502. $Pred_{DC}$(INTRA_DC) is equal to the sum of prediction values of the left and upper boundary pixels at first row 516 and first column 514 in the current coding unit 502 plus $DCVal*(2N-1)^2$, and then divided by the total number of pixels in the current coding unit.

$$Pred_{DC}(\text{INTRA\_DC}) = \frac{\left(\sum_{x=0}^{N-1} p(x,0) + \sum_{y=1}^{N-1} p(0,y)\right) + DCVal*(2N-1)^2}{N^2} \quad (5)$$

where N stands for the width and height of the current coding unit 502, DCVal is calculated as above, x stands for the horizontal ordinate, y stands for the vertical ordinate, p(x, 0) stands for the smoothed values of the above row 516 of pixels at (x, 0), where x=0 . . . N−1, and p(0, y) stands for the values of the left column 514 of pixels at (0, y), where y=1 . . . N−1. For an 8×8 coding unit then, this includes the calculation for the prediction value of at least 15 pixels at the boundary for each coding unit, and within the coding unit.

Figure 6:
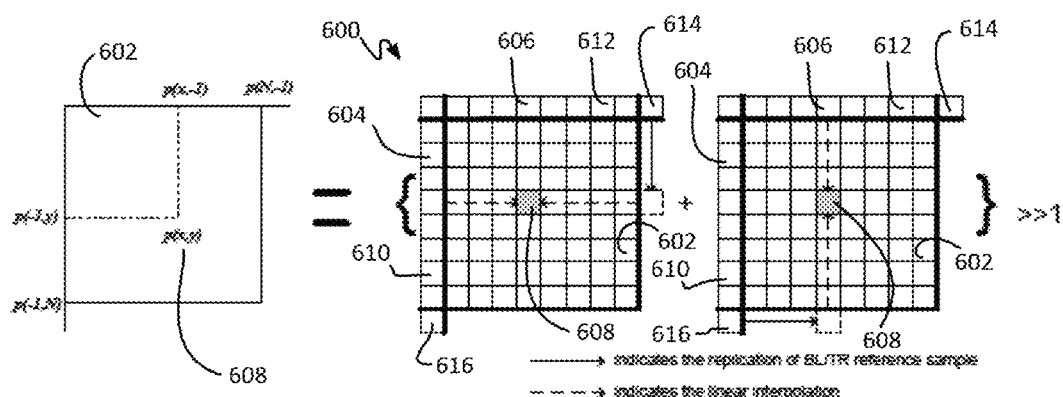
FIG. 6 is an illustrative diagram of coding units to explain intra planar coding.

Referring to FIG. 6, a depth map 600 with a coding unit 602 is provided to explain the non-modified intra planar coding for the SDC-coded coding unit in HTM6.1. Coding unit 602 has N×N pixels, and here 8×8. Coding unit 602 also may be formed of pixels 608 designated as p(x, y). A left coding unit 604 is adjacent a left side of the current coding unit 602, and an upper coding unit 606 is adjacent an upper side of the current coding unit 602. The left coding unit 604 may have a left column 610 of neighboring pixels, and in one example, the left column 610 is adjacent the left side of the current coding unit 602. Similarly, the upper coding unit 606 may have an above row 612 of neighboring pixels, and by one example, adjacent the upper side of the coding unit 602. Also, an above-right pixel 614 is along the above row 612 but located outside both the current and upper coding unit 602 and 606. Similarly, a left-bottom pixel 616 is located along the left column 610 but below the left column and outside the left coding unit 604 and the current coding unit 602.

When sdc_pred_mode equals intra_planar, the calculation of a constant $Pred_{DC}(INTRA\_PLANAR)$ includes the following. First, a prediction value for each pixel p(x, y) in the current coding unit is calculated by:

$$p(x,y)=((N-x-1)*p(-1,y)+(x+1)*p(N,-1)+(N-y-1)*p(x,-1)+(y+1)*p(-1,N)+N)/2N \qquad (6)$$

wherein N stands for the width and height of the current coding unit, x and y respectively stand for the horizontal and vertical ordinates, p(x, −1) stands for the values of the above row 612 neighboring pixels at (x, −1), where x=0 . . . N−1, p(−1, y) stands for the values of the left column 610 neighboring pixels at (−1, y) where y=0 . . . N−1, p(N, −1) stands for the value of the above-right neighboring pixel 614 on the above row outside the current coding unit 602, p(−1, N) stands for the value of the left-bottom neighboring pixel 616 on the left column outside the current coding unit 602. As shown in FIG. 6, this results in an interpolation between the pixel value in the above-right pixel 614 and a value in the left column 614. Likewise, the calculation uses an interpolation between the pixel value of the lower-left pixel 616 and a value from the above row 612 of pixels. Then these two interpolations are averaged, among other things, as described in equation (6) to determine the individual prediction value for the individual pixel p(x, y). Note that >>1 on FIG. 6 refers to a C language bitshift one to the right that may be used for coding of the intra planar prediction value. Also, BL/TR on FIG. 6 stands for below-left/top-right.

Next, the constant prediction value $Pred_{DC}(INTRA\_PLANAR)$, as the prediction value of the whole SDC-coded coding unit is calculated. $Pred_{DC}(INTRA\_PLANAR)$ is equal to the sum of prediction values of all pixels of the current coding unit 602 divided by the total number of pixels of the current coding unit as:

$$Pred_{DC}(INTRA\_PLANAR) = \frac{\sum_{x=0}^{N-1}\sum_{y=0}^{N-1} p(x,y)}{N^2} \qquad (7)$$

where the variables are defined as in equation (6). For an 8×8 pixel coding unit then, this equation uses 64 prediction values to obtain a single prediction value ($Pred_{DC}$(INTRA_PLANAR)) for the coding unit.

Implementations described herein modify the intra DC coding and the Ultra planar coding to reduce the number of computations and the complexity of the calculations that must be performed to obtain a constant prediction value for a current coding unit. A number of ways to do this exists and are described below.

Figure 7:
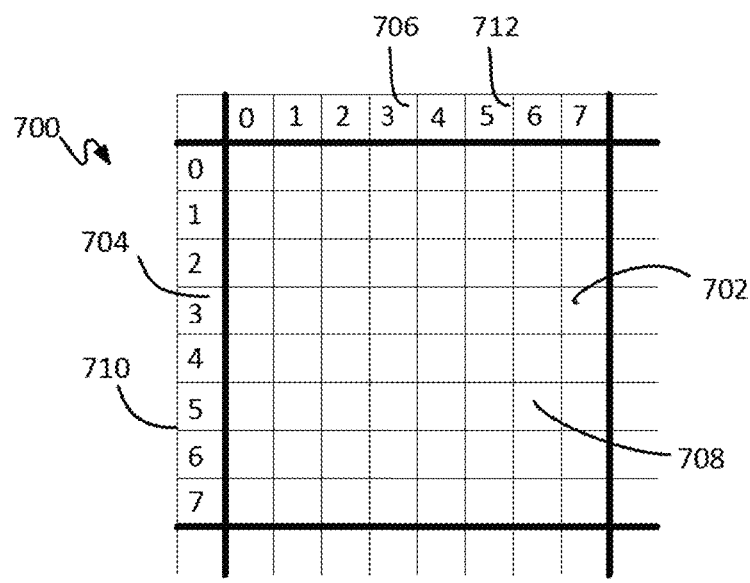
FIG. 7 is an illustrative diagram of coding units to explain intra DC coding in accordance with the implementations herein.

Referring to FIG. 7, when the modified intra DC coding (INTRA_DC_MOD) is selected as the SDC prediction mode (SDC_pred_mode), a sub-sampling method may be applied to the outside left column of neighboring pixels or the outside above row of neighboring pixels or both to derive the constant prediction value of the current coding unit. In more detail, an example depth map 700 is shown to explain modified intra DC coding of an SDC-coded coding unit. A current coding unit 702 to be coded is set as N×N pixels, and here 8×8. A left coding unit 704 is disposed adjacent and to the left of the current coding unit 702, and an upper coding unit 706 is disposed adjacent and above the current coding unit 702. The left coding unit 704 may have a left column 710 of neighboring pixels numbered 0 to 7, and in one example, the left column 710 is adjacent the left side of the current coding unit 702. Similarly, the upper coding unit 706 may have an above row 712 of neighboring pixels numbered 0 to 7, and by one example, adjacent the upper side of the coding unit 702. It will be understood, however, that the left column and above row may be other than adjacent the current coding unit if desired although still in the left coding unit and/or upper coding unit. Many other examples are contemplated.

By one example, if the current coding unit 702 is coded by SDC approach where the SDC flag is true, and the SDC prediction mode sdc_pred_mode equals INTRA_DC_MOD, a constant prediction value $Pred_{DC}(INTRA\_DC\_MOD)$ is used as the prediction value of the whole coding unit. By one example form, $Pred_{DC}(INTRA\_DC\_MOD)$ is calculated by rounding up the average value of the left column neighboring pixels and the above row neighboring pixels. A sub-sampling method can be applied to the left column 710 neighboring pixels and/or the above row 712 neighboring pixels to derive the constant prediction value of current coding unit 702. In this case, at least one and less than all pixel values from the left column are used, or at least one and less than all pixel values from the above row are used or both. This process may be performed without a boundary smoothing calculation to obtain the prediction value, and without using individual prediction values from the first row and first column within the current coding unit.

To accomplish this, the prediction value ($Pred_{DC}$(INTRA_DC_MOD)) of the current coding unit 702 may be computed by:

$$Pred_{DC}(INTRA\_DC\_MOD) = Round\left(\frac{\sum_{x=0}^{N-1} p(x,-1) + \sum_{y=0}^{N-1} p(-1,y)}{2N'}\right) \qquad (8)$$

$$= \frac{\sum_{x=0}^{N-1} p(x,-1) + \sum_{y=0}^{N-1} p(-1,y) + N'}{2N'}$$

where Round(●) stands for a rounding function, N stands for the width and height of the current coding unit, N' stands for the sub-sampled width and height of the current coding unit, $$N' = \frac{N}{\alpha},$$

where α is the sub-sample factor, and where α=2, 3, . . . N where x stands for the horizontal ordinate, y stands for the vertical ordinate, p(x, −1) stands for the values of the above row 712 neighboring pixels at (x, −1), where x=0, α, 2α . . . , and where x<N−1, p(−1, y) stands for the values of left column 710 neighboring pixels at (−1, y), where y=0, α, 2α . . . , and where y<N−1. Sub-sampling then uses every αth pixel in the left column and above row where α>1, Thus, for example if α=3, then pixels 0, 3, and 6 of the left column 710 and above row 712 are used for the sub-sampling. Such a configuration may reduce the number of reference pixel calculations by a significant number to determine $Pred_{DC}$(INTRA_DC_MOD).

Figure 8:
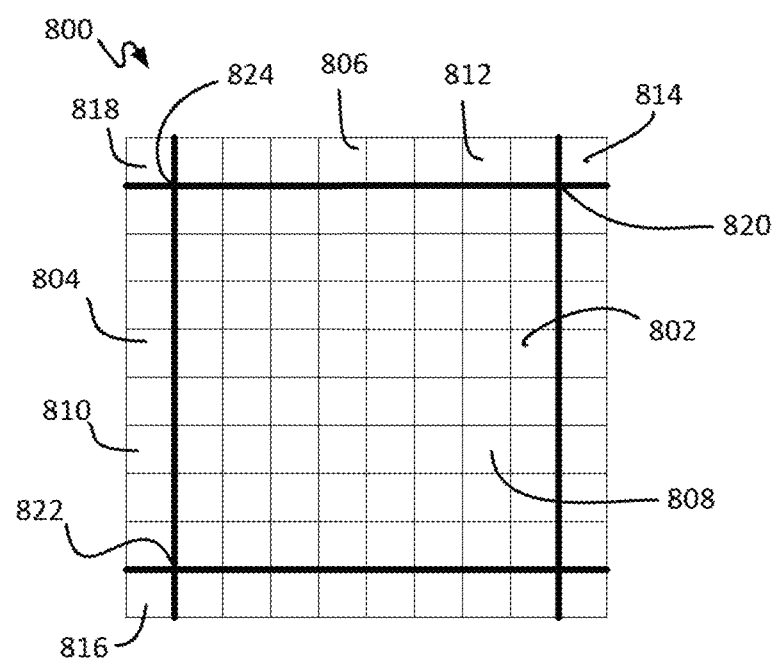
FIG. 8 is an illustrative diagram of coding units to explain intra planar coding in accordance with the implementations herein.

Referring to FIG. 8, a depth imp 800 with a current coding unit 802 is shown to explain modified intra planar coding. A current coding unit 802 to be coded is set as N×N pixels, and here 8×8. A left coding unit 804 is disposed adjacent and to the left of the current coding unit 802, and an upper coding unit 806 is disposed adjacent and above the current coding unit 802. The left coding unit 804 may have a left column 810 of neighboring pixels, and in one example, the left column 810 is adjacent the left side of the current coding unit 802. Similarly, the upper coding unit 806 may have an above row 812 of neighboring pixels, and by one example, adjacent the upper side of the coding unit 802. It will be understood, however, that the left column and above row may be other than adjacent the current coding unit if desired although still in the left coding unit and/or upper coding unit. Many other examples exist such as using an outside row or column of reference pixels that may be in the same row or column of coding units as the current coding unit but outside the left adjacent and/or upper adjacent coding unit to name an example.

Coding unit 802 also is disposed near a neighboring, outside upper-right pixel 814 disposed adjacent and diagonally outward from the upper-right corner 820 of the coding unit 802. Another way to describe the position of this pixel is to state that the upper-right pixel 814 is the above-right neighboring pixel on the above row outside the current coding unit. Likewise, a neighboring outside lower-left pixel 816 is disposed adjacent and diagonally outward from the lower-left corner 822 of the coding unit 802. Again, another way to describe this position is to state that the lower-left pixel 816 is the left-bottom neighboring pixel on the left column outside the current coding unit.

Where SDC approach is selected (SDC flag is true), and sdc_pred_mode is INTRA_PLANAR_MOD, a constant prediction value $Pred_{DC}$(INTRA_PLANAR_MOD) may be used as the prediction due for the whole coding unit 802. Starting with the equation (6) repeated here, this equation is used to determine individual prediction values for each pixel p(x, y) in INTRA_PLANAR mode coding under HTM6.1. The equation (6) may be reduced, using substitution, to simplify the equation.

$$p(x,y) = ((N-x-1)*p(-1,y)+(x+1)*p(N,-1)+(N-y-1)*p(x,-1)+(y+1)*p(-1,N)+N)/2N \quad (6)$$

As illustrated in FIG. 6, the calculation of the planar prediction value of each pixel p(x, y) consists of an average of a 1D horizontal linear prediction and a 1D vertical linear prediction (where 1D may refer to a single dimension window pattern for a calculation such as a row or column of pixels). In that sense, the calculation of $Pred_{DC}$(Intra_Planar) for the whole SDC-coded coding unit can be written as:

$$Pred_{DC}(\text{INTRA\_PLANAR}) = \frac{\sum_{x=0}^{N-1}\sum_{y=0}^{N-1} p(x,y)}{N^2} = \frac{H+V+N^2}{2N^2} \quad (10)$$

where similar variables are defined the same as that used for equations (6) and (7) above, but otherwise H stands for the sum of prediction values of 1D horizontal linear predictions, and V stands for the sum of prediction values of 1D vertical linear predictions.

To simplify equation (10) and still obtain $Pred_{DC}$ (Intra_planar_mod), in one form, the equation may be placed in terms of interpolation from the neighboring and outside pixels. This shows that $Pred_{DC}$(Intra_DC), and in turn sub-sampling, of the left column 810 and above row 812 may become part of the equation as follows. Firstly, the sum of prediction values of 1D horizontal linear prediction are calculated as follows:

$$H = \sum_{x=0}^{N-1}\sum_{y=0}^{N-1}\left(\frac{(N-x-1)*p(-1,y)+(x+1)*p(N,-1)}{N}\right) \quad (11)$$

$$H = \frac{(1+2+\ldots+N-1)*\sum_{y=0}^{N-1}p(-1,y)+ (1+2+\ldots+N)*\sum_{y=0}^{N-1}(p(N,-1))}{N} \quad (12)$$

$$H = \frac{N-1}{2}\sum_{y=0}^{N-1}p(-1,y)+\frac{N+1}{2}*N*p(N,-1) \quad (13)$$

Similarly, the sum of prediction values of 1D vertical linear prediction is calculated:

$$V = \sum_{x=0}^{N-1}\sum_{y=0}^{N-1}\left(\frac{(N-y-1)*p(x,-1)+(y+1)*p(-1,N)}{N}\right) \quad (14)$$

$$V = \frac{(1+2+\ldots+N-1)*\sum_{x=0}^{N-1}p(x,-1)+ (1+2+\ldots+N)*\sum_{y=0}^{N-1}(p(-1,N))}{N} \quad (15)$$

$$V = \frac{N-1}{2}\sum_{x=0}^{N-1}p(x,-1)\frac{N+1}{2}*N*p(-1,N) \quad (16)$$

Finally, the equations can be combined, reduced, and substituted to include $Pred_{DC}$(Intra_DC) as follows:

$$Pred_{DC}(\text{Intra\_planar}) = \frac{H+V+N^2}{2N^2} \quad (17)$$

$$Pred_{DC}(\text{Intra\_planar}) = \frac{(N-1)*\left(\sum_{x=0}^{N-1}p(-1,y)+\sum_{y=0}^{N-1}p(x,-1)\right)+ (N+1)*N*(p(N,-1)+p(-1,N))+2N^2}{4N^2} \quad (18)$$

$$Pred_{DC}(\text{Intra\_planar}) = \frac{2*(N-1)*\frac{\sum_{x=0}^{N-1}p(-1,y)+\sum_{y=0}^{N-1}p(x,-1)}{2N}+ (N+1)*(p(N,-1)+p(-1,N))+2N}{4N} \quad (19)$$

$$Pred_{DC}(\text{Intra\_planar}) \approx \frac{2*(N-1)*Pred_{DC}(\text{INTRA\_DC})+ (N+1)*(p(N,-1)+p(-1,N))+2N}{4N} \quad (20)$$

Therefore, with these forms in mind, when simplified depth coding and intra planar coding are selected, at least the following four possible implementations may be used to obtain the prediction value, $Pred_{DC}$(INTRA_PLANAR_MOD) for the whole coding unit that combines intra planar coding using outside corner pixels and the sub-sampling of the left column and above row. Thus, $Pred_{DC}(INTRA\_PLANAR\_MOD)$ may be calculated from values of the above row neighboring pixels 812, left column neighboring pixels 810, above-right neighboring pixel 814, and left-bottom neighboring pixel 816. Moreover, the sub-sampling method can be applied to left column neighboring pixels and above row neighboring pixels as already described herein.

A first implementation of $Pred_{DC}(INTRA\_PLANAR\_MOD)$ is as follows:

$$Pred_{DC}(INTRA\_PLANAR\_MOD) = \quad (21)$$

$$\frac{(N'-1)*\left(\sum_{x=0}^{N-1}p(x,-1)+\sum_{y=0}^{N-1}p(-1,y)\right)+}{N'*(N'+1)*(p(N,-1)+p(-1,N))+2N'^2}$$
$$\frac{}{4N'^2}$$

where N stands for the width and height of the current coding unit, N' stands for the sub-sampled width and height of the current coding unit, $$N' = \frac{N}{\alpha},$$

where $\alpha$ is the sub-sample factor, $\alpha=2, 3, \ldots N$, x stands for the horizontal ordinate, y stands for the vertical ordinate, $p(x, -1)$ stands for the values of above row 812 neighboring pixels at $(x, -1)$, where $x=0, \alpha, 2\alpha \ldots$, and where $x<N-1$, $p(-1, y)$ stands for the values of left column neighboring pixels at $(-1, y)$ where $y=0, \alpha, 2\alpha \ldots$, axed where $y<N-1$, $p(N, -1)$ stands for the value of the above-right neighboring pixel 814 on the above row outside the current coding unit 802, and disposed adjacent and diagonally outward from the upper-right corner 820 of the coding unit 802, and $p(-1, N)$ stands for the value of the left-bottom neighboring pixel 816 on the left column outside the current coding unit, and disposed adjacent and diagonally outward from the lower-left corner 822 of the coding unit 802.

A second implementation of $Pred_{DC}(INTRA\_PLANAR\_MOD)$ is as follows:

$$Pred_{DC}(INTRA\_PLANAR\_MOD) = \quad (22)$$

$$\frac{\left(\begin{array}{c}2(N'-1)*Pred_{DC}(INTRA\_DC)+\\(N'+1)*(p(N,-1)+p(-1,N))+2N'\end{array}\right)}{4N'}$$

where $$Pred_{DC}(INTRA\_DC) = \frac{\sum_{x=0}^{N-1}p(x,-1)+\sum_{y=0}^{N-1}p(-1,y)}{2N'} \quad (23)$$

which is the sub-sampling equation (8) without the rounding. Otherwise the variables are as described with equation (21) above. It will be understood that equation (22) is similar to equation (21) except here, the equation may use previously calculated intra DC values for the intra planar calculation, and particularly with modified intra DC coding that uses sub-sampling.

A third implementation of $Pred_{DC}(INTRA\_PLANAR\_MOD)$ is as follows.

$$Pred_{DC}(INTRA\_PLANAR\_MOD) = \quad (24)$$

$$\frac{\sum_{x=0}^{N-1}p(x,-1)+\sum_{y=0}^{N-1}p(-1,y)+}{N'*(p(N,-1)+p(-1,N))+2N'}$$
$$\frac{}{4N'}$$

where the variables are as described above.

A fourth implementation of $Pred_{DC}(INTRA\_PLANAR\_MOD)$:

$$Pred_{DC}(INTRA\_PLANAR\_MOD) = \quad (25)$$

$$\frac{2Pred_{DC}(INTRA\_DC)+p(N,-1)+p(-1,N)+2}{4}$$

where $Pred_{DC}(Intra\_DC)$ is calculated from equation (8) as mentioned above, and where otherwise the variables are as described above.

Compared to the $Pred_{DC}(INTRA\_PLANAR)$ calculation in HTM6.1, these implementations skip the exhaustive calculations of prediction values for each of the pixels within the current coding unit, and skip the averaging computation for each of the pixels in the coding unit. Instead, implementations here generate $Pred_{DC}(INTRA\_PLANAR\_MOD)$ for all the pixels of the whole coding unit from values outside of the current coding unit, and specifically from the above row neighboring pixels, left column neighboring pixels, above-right neighboring pixel, and left-bottom neighboring pixel while applying sub-sampling of the left column neighboring pixels and above row neighboring pixels to derive the constant prediction value of the current coding unit with lower power consumption.

In other forms, $Pred_{DC}(INTRA\_PLANAR\_MOD)$ is calculated by also using the pixel value from a neighboring, outside upper-left pixel 818 disposed adjacent and diagonally outward from an upper-left corner 824 of the coding unit 802. The upper-left pixel 818 is outside of the current coding unit 802, the left coding unit 804, and the upper coding unit 806. This form of modified intra planar coding also uses the pixel values in the left column 810 of pixels adjacent the current coding unit 802 in the left coding unit 804, and the above row 812 of pixels adjacent the current coding unit 802 in the upper coding unit 806. Thus, the values of the above row neighboring pixels, left column neighboring pixels, above-right neighboring pixel, left-bottom neighboring pixel, and above-left neighboring pixel are used in a process that combines the sub-sampling of the left column 810 and above row 812 with the use of three outside corner pixels, the lower-left pixel 816, the upper-right pixel 814, and the upper-left pixel 818.

For this implementation, $Pred_{DC}(INTRA\_PLANAR\_MOD)$ may be found as follows:

$$Pred_{DC}(INTRA\_PLANAR\_MOD) = \quad (26)$$

$$\frac{\sum_{x=0}^{N-1}p(x,-1)+\sum_{y=0}^{N-1}p(-1,y)+}{\frac{N'}{2}*(p(N,-1)+p(-1,N)+2*p(-1,-1))+2N'}$$
$$\frac{}{4N'}$$

where the variables are as described above. For clarity, p(x, −1) stands for the values of above row 812 neighboring pixel at (x, −1), where x=0, α, 2α ..., and where x<N−1, p(−1, y) stands for the values of left column 810 neighboring pixel at (−1, y), where y=0, α, 2α ..., and where y<N−1, p(N, −1) stands for the value of the above-right neighboring pixel 814, p(−1, N) stands for the value of the left-bottom neighboring pixel 816, and p(−1, −1) stands for the value of the left-top neighboring pixel 818.

By another implementation, equation (26) is reduced by substitution to find Pred$_{DC}$(INTRA_PLANAR_MOD) as:

$$Pred_{DC}(\text{INTRA\_PLANAR\_MOD}) = \frac{\left( \begin{array}{c} Pred_{DC}(\text{INTRA\_DC}) + \\ p(N, -1) + p(-1, N) + p(-1, -1) + 2 \end{array} \right)}{4} \quad (27)$$

where the variables are as described above. The difference between equation (26) and equation (27) is that, here, prediction values for intra DC prediction may be calculated first, and then used by equation (27). By other approaches, any combination of three corner pixels may be used for this alternative process. Thus, the lower-right corner may be used instead of the upper-left corner, and so forth. Any combination of three corners to alter equations (25)-(27) above is contemplated here.

By yet another approach, sampling from the left column and above row in the left and upper coding units respectively, may be eliminated to simplify the calculations even further. In this case, the prediction value for the coding unit becomes a rougher estimation sacrificing some accuracy for gains in speed and reduction of power consumption. The sacrifice in accuracy, by one form, still is not noticeable to a person viewing a display. For this case, intra planar coding may be used to calculate the prediction value as follows:

$$Pred_{DC}(\text{INTRA\_PLANAR\_MOD}) = \frac{(p(N, -1) + p(-1, N) + 1)}{2} \quad (28)$$

where the variables that are similar are already described above for equation (26). Mainly, the prediction value for the coding unit may be based on two outside, corner values without sampling a column or row from the left or above coding units, and in one form, without using any pixel values from the left coding unit 804 and the upper coding unit 806. Thus, in one example, Pred$_{DC}$(INTRA_PLANAR_MOD) for the current coding unit 802 is found by limiting the equation to two outside pixel values, and specifically the pixel values from a neighboring, outside lower-left pixel 816 disposed adjacent and diagonally outward from a lower-left corner 822 of the coding unit, and a neighboring, outside above-right pixel 814 disposed adjacent and diagonally outward from an upper-right corner 820 of the coding unit. This still may be performed without calculating prediction values for individual pixels within the current coding unit. This results in significant reduction in power consumption as discussed above.

Figure 9:
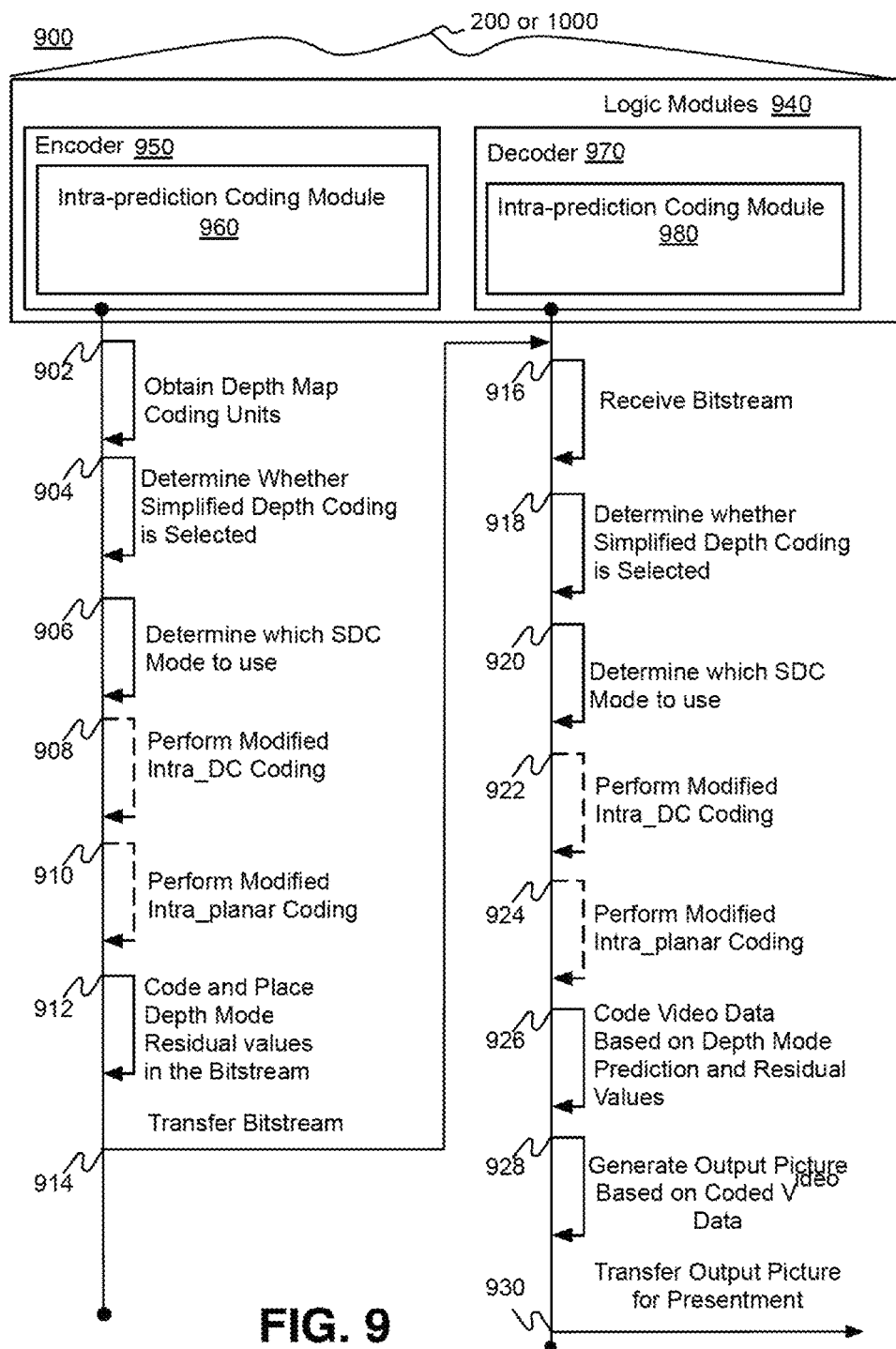
FIG. 9 illustrates a diagram of a video coding system in operation.

Referring to FIG. 9, video coding system 200 or 1000 or 1300 may be used for an example video coding process 900 shown in operation, and arranged in accordance with at least some implementations of the present disclosure. In the illustrated implementation, process 900 may include one or more operations, functions or actions as illustrated by one or more of actions 902-930 numbered evenly, and used alternatively or in any combination. By way of non-limiting example, process 900 will be described herein with reference to example video coding system 200 of FIG. 2 or 1000 of FIG. 10 (or by system 1300 though not indicated on FIG. 9).

In the illustrated implementation, video coding system 200 may include logic modules 940, the like, and/or combinations thereof. For example, logic modules 940 may include encoder 950 and may correspond to encoder 202 or encoder 1004, for example. Encoder 950 may include intra-coding module 960. A decoder 970 may correspond to decoder 203 or decoder 1010, and decoder 970 may include intra-coding module 980. Although video coding system 200 or 1000, as shown in FIG. 9, may include one particular set of operations or actions associated with particular modules, these operations or actions may be associated with different modules than the particular module illustrated here. Although process 900, as illustrated, is directed to encoding and decoding, the concepts and/or operations described may be applied to encoding and/or decoding separately, and, more generally, to video coding.

Process 900 may include "OBTAIN DEPTH MAP CODING UNITS" 902, where information about a depth map is obtained including the location and sizes of the coding units as well as which coding units already have depth values and which are still missing depth values.

Process 900 may then "DETERMINE WHETHER SIMPLIFIED DEPTH CODING IS SELECTED" 904 for a current coding unit. This may be performed, as mentioned above, depending on Whether an SDC flag is true, or some other similar indicator. In other words, SDC may be omitted altogether if no SDC flag is set.

Process 900 continues with "DETERMINE WHICH SDC MODE TO USE" 906. SDC may provide intra_DC coding, intra_planar coding, and intra_DMM coding as options, while modified intra_DC coding or modified intra_planar coding or both may be provided as options as well. By one approach, the system provides the option to code the coding unit with (1) intra DC coding using all of the pixels of a left column of pixels in the left coding unit, and using all of the pixels of an above row of pixels in the upper coding unit, (2) intra DMM (depth modeling mode) coding, (3) intra planar coding determining the prediction value for individual pixels within the coding unit, (4) modified intra DC coding with sub-sampling, and (5) modified intra planar coding. In some forms, option (4) or option (5) may be provided without providing both (4) and (5).

Process 900 may continue with "PERFORM MODIFIED INTRA_DC_CODING" 908 to determine a prediction value for a coding unit based, at least in part, on sub-sampling of the outside left column of pixels and outside above row of pixels as described above.

Optionally, process 900 carries out "PERFORM MODIFIED INTRA PLANAR CODING" 910 to calculate the prediction values for a coding unit. This may be performed by using sub-sampling and two outside corner pixel values, using the sub-sampling combined with the use of three outside corner values, or by using two corner pixel values without sampling the outside, neighboring left column and above row of pixels as described above.

Process 900 then may "CODE AND PLACE THE PREDICTION RESIDUALS IN THE BIT STREAM" 912. This includes determining residuals for each of the coding units, and using the residuals and prediction values to reconstruct the pixels in a prediction loop to code further depth maps or views as described with video coding system 200. The residuals are also coded for placement into the bitstream, and may be coded along with other texture and map data as well as camera data. The process 900 then includes "TRANSFER BITSTREAM" 914 where the encoded bit stream may be transferred to a decoder for example. In various implementations, the encoder 950 and decoder 970 may be operated substantially independently. In one example, one may be at a content provider system and the other at a client system. In various examples, the bitstream may be transferred via the Internet, via a memory device, or the like. As will be appreciated, in some implementations, the bitstream may be transferred to multiple devices either serially or in parallel.

Process 900 may continue from "RECEIVE BITSTREAM" 916, where a bitstream associated with video data and including depth map coding unit information is included and may be received at decoder 970. From there, the decoder 970 operates its own prediction or reconstruction loop similar to the prediction loop operated by the encoder 950. Thus, operations to "DETERMINE WHETHER SIMPLIFIED DEPTH CODING IS SELECTED" 918, "DETERMINE WHICH SDC MODE TO USE" 920, "PERFORM MODIFIED INTRA_DC CODING" 922, and "PERFORM MODIFIED INTRA_PLANAR CODING" 924 are respectively similar to the operations 904, 906, 908, and 910 at the encoder 950. As with the encoder, these operations provide a segment or prediction residual for a coding unit, and calculated with an SDC modified intra DC coding or modified intra planar coding.

Process 900 may continue with "CODE VIDEO DATA BASED ON DEPTH MAP PREDICTION VALUES AND RESIDUALS" 926, where video data may be coded based at least in part on the depth map values reconstructed from the prediction values and the residuals. Where SDC intra DC or intra planar coding is used, the pixels in the coding unit will all have the same value.

Process 900 may then include "GENERATE OUTPUT PICTURES BASED ON THE CODED VIDEO DATA" 928, where output pictures are generated based on the coded video data for ultimate display and/or storage of the pictures.

Process 900 may continue to "TRANSFER OUTPUT PICTURE FOR PRESENTMENT" 930, where the output picture may be transferred for presentment. For example, an output picture may be presented to a user via a display device. While implementation of example process 300, 400, or 900 may include the undertaking of all operations shown in the order illustrated, the present disclosure is not limited in this regard and, in various examples, implementation of any of the processes herein may include the undertaking of only a subset of the operations shown and/or in a different order than illustrated.

Other simplified depth coding implementations with modified intra DC and/or modified intra planar coding for 3D video coding are as follows.

The method wherein if the current coding unit is coded with SDC approach (SDC flag of current coding unit is true) and sdc_pred_mode is INTRA_DC, a prediction value, $Pred_{DC}(INTRA\_DC)$ is calculated for the whole coding unit by averaging the values of left column neighboring pixels and above row neighboring pixels. And a sub-sampling method can be applied to left column neighboring pixels and above row neighboring pixels to derive the constant prediction value of current coding unit.

The method wherein if the current coding unit is coded by SDC approach (SDC flag of current coding unit is true) and sdc_pred_mode is INTRA_PLANAR, a prediction value, $Pred_{DC}(INTRA\_PLANAR)$ is calculated for the whole coding unit from left column neighboring pixels, above row neighboring pixels, above-right neighboring pixel, and left-bottom neighboring pixel. And a sub-sampling method can be applied to left column neighboring pixels and above row neighboring pixels to derive the constant prediction value of current coding unit.

The method wherein if the current coding unit is coded by SDC approach (SDC flag of current coding unit is true) and sdc_pred_mode is INTRA_PLANAR_NEW, a prediction value, $Pred_{DC}(INTRA\_PLANAR\_NEW)$, is calculated for the whole coding unit from left column neighboring pixels, above row neighboring pixels, above-right neighboring pixel, left-bottom pixel, and above-left neighboring pixel. And a sub-sampling method can be applied to left column neighboring pixels and above row neighboring pixels to derive the constant prediction value of current coding unit.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
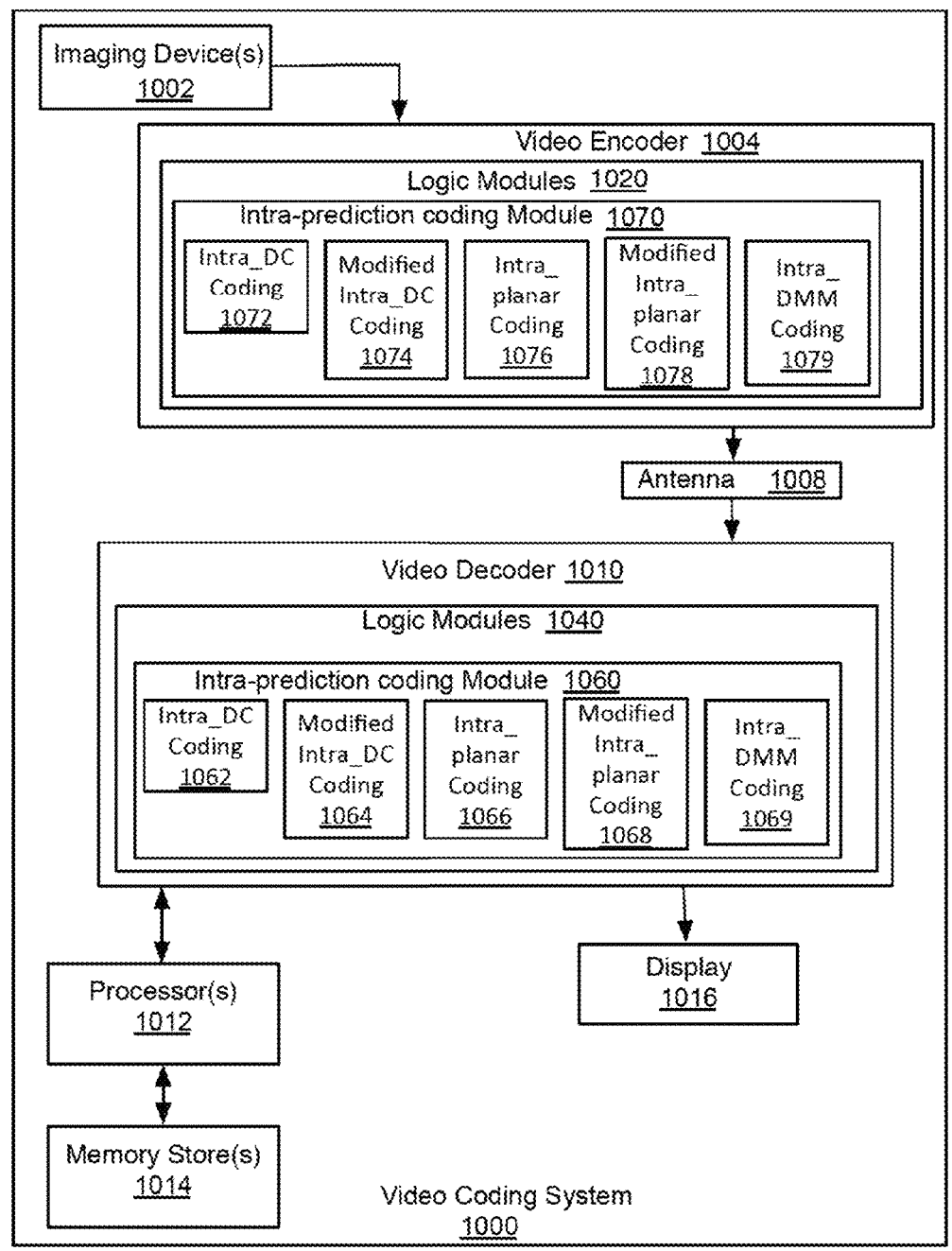
FIG. 10 is an illustrative diagram of an example system.

Referring to FIG. 10, an example video coding system 1000 may be arranged in accordance with at least some implementations of the present disclosure. In the illustrated implementation, video coding system 1000 may include imaging device(s) 1002, a video encoder 1004, an antenna 1008, a video decoder 1010, one or more processors or processor cores 1012, one or more memory stores 1014, and at least one display 1016. In some examples, video encoder 1004 may implement one or more logic modules 1020 which may include an intra-prediction coding or intra coding module 1070, other modules, and the like, or any combination thereof. The intra coding module 1070, by one form, may include an intra DC module 1072, modified intra DC module 1074, intra planar module 1076, modified intra planar module 1078, and intra DMM module 1079, the like, or any combination thereof that may respectively perform the indicated coding. Likewise, the video decoder 1010 may have logic modules 1040 with an intra-coding module 1060, the like, and/or combinations thereof that perform the indicated coding. By one form, the intra coding module 1060 may include intra DC module 1062, modified intra DC module 1064, intra planar module 1066, modified intra planar module 1068, and intra DMM module 1069, the like, or any combination thereof.

As illustrated, antenna 1008, video decoder 1010, processor 1012, memory store 1014, and/or display 1016 may be capable of communication with one another and/or communication with portions of logic modules 1040. Similarly, imaging device(s) 1002 and video encoder 1004 may be capable of communication with one another and/or communication with portions of logic modules 1020, other modules, the like, or combinations thereof. Accordingly, video decoder 1010 may include all or portions of logic modules 1040, while video encoder 1004 may include similar and/or other logic modules 1020. Although video coding system 1000, as shown in FIG. 10, may include one particular set of processes, process steps, operations, functions, and/or actions associated with particular modules, these actions may be associated with different modules than the particular module illustrated here.

In some examples, video coding system 1000 may include antenna 1008, video decoder 1010, the like, and/or combinations thereof. Antenna 1008 may be configured to receive an encoded bitstream of video data. Video encoder 1004 may be communicatively coupled to antenna 1008 to encode a bitstream and transfer the bitstream via antenna 1008 to video decoder 1010 for the video decoder to decode the encoded bitstream. Video encoder 1004, video decoder 1010, or both may be configured to intra-code at least one coding unit of at least one depth map, and depending on the size of the coding unit, using at least one simplified depth coding mode, as discussed herein.

In other examples, video coding system 1000 may include at least one display device 1016, one or more processors 1012, one or more memory stores 1014, intra-coding module 1060, the like, and or combinations thereof. Display device 1016 may be configured to present video data such as output pictures. Processors 1012 may be communicatively coupled to display 1016. Memory stores 1014 may be communicatively coupled to the one or more processors 1012. Video decoder 1010 (or video encoder 1004 in other examples) may be communicatively coupled to the one or more processors 1012 and may be configured to intra-code at least one coding unit of at least one depth map, and depending on the size of the coding unit, using at least one simplified depth coding mode, and simplify depth code the video data based at least in part on the size of the coding unit, such that the presentment of image data via display device 1016 may be based at least in part on the coded video data. Processors may also be provided for the encoder and communicatively coupled to a display, memory stores, logic modules, and so forth.

In various implementations, intra-coding module 1070 or 1060 or both may be implemented in hardware, while software may implement other logic modules. For example, in some implementations, modules 1070 and 1060 may be implemented by application-specific integrated circuit (ASIC) logic while other logic modules may be provided by software instructions executed by logic such as processors 1012. However, the present disclosure is not limited in this regard and intra-coding modules 1070 and 1060 and/or other logic modules may be implemented by any combination of hardware, firmware and/or software. In addition, memory stores 1014 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1014 may be implemented by cache memory.

Figure 11:
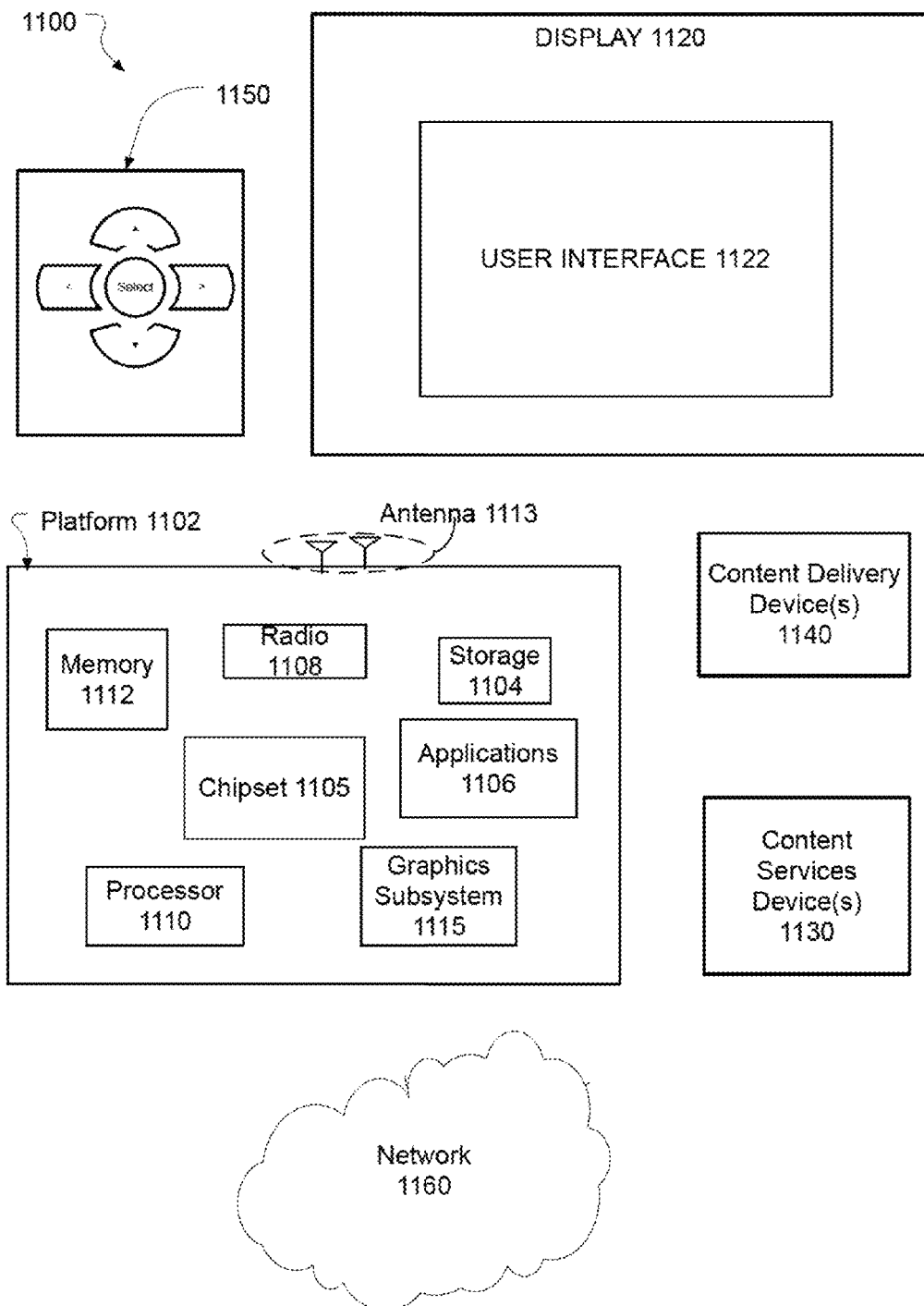
FIG. 11 is an illustrative diagram of another example system.

Referring to FIG. 11, an example system 1100 is provided in accordance with the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interact device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1106 and/or radio 1108. Chipset 1105 may provide intercommunication among processor 1110, memory 1112, storage 1104, graphics subsystem 105, applications 1106 and/or radio 1108. For example, chipset 1105 may include a storage adapter (not depicted) capable of providing, intercommunication with storage 1104.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1104 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further implementations, the functions may be implemented in a consumer electronics device.

Radio 1108 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1108 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1106, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone. Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1106, the navigation features located on navigation controller 1150 may be mapped to virtual navigation features displayed on user interface 1122, for example. In various implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB) backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming, video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
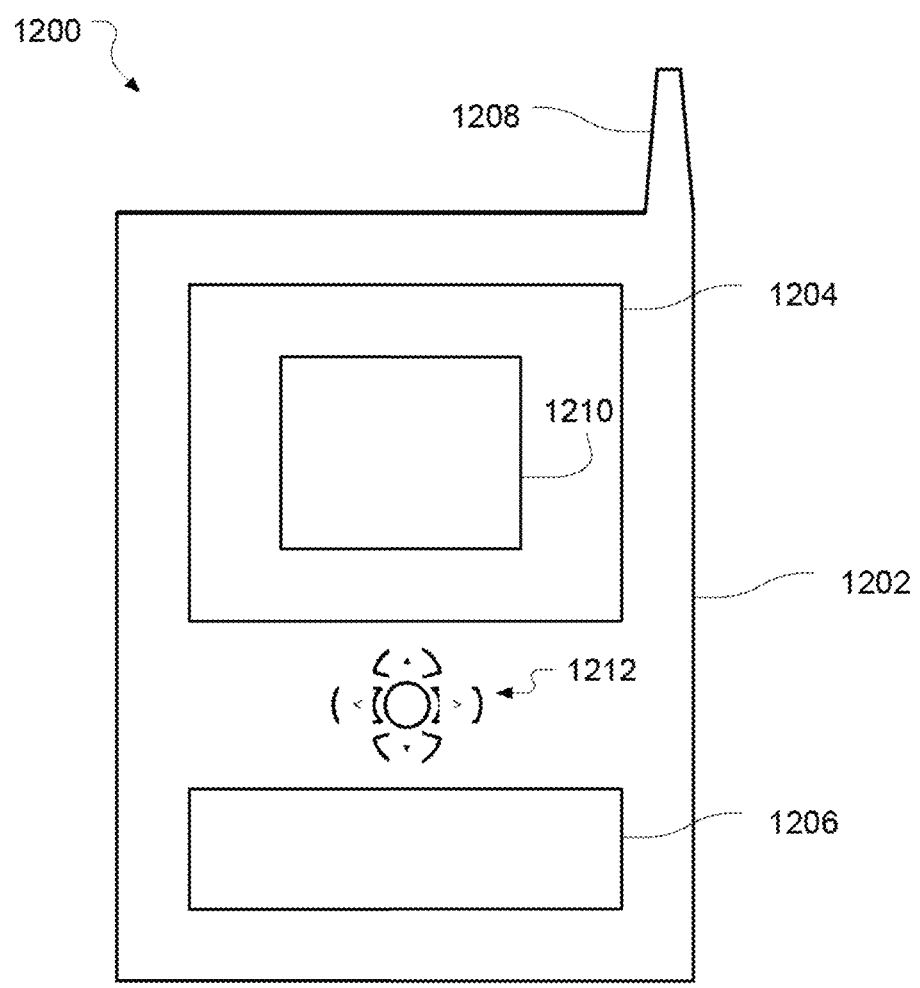
FIG. 12 illustrates an example device, all arranged in accordance with at least some implementations of the present disclosure.

As described above, system 200, 1000, or 1300 may be embodied in varying physical styles or form factors. FIG. 12 illustrates implementations of a small form factor device 1200 in which system 200, 1000, or 1300 may be embodied. In various implementations, for example, device 1200 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

Referring to FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DST), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one approach, a computer implemented method for 3D video coding comprises simplified depth coding by performing modified intra DC coding or modified intra planar coding of at least one coding unit associated with a plurality of pixels and of at least one depth map. The method comprises forming a prediction value of the at least one coding unit based, at least in part, on pixel values outside of the coding unit on the depth map, and without calculating prediction values of individual pixels within the coding unit.

In other variations, the coding unit is a current coding unit, a left coding unit is disposed adjacent and to the left of the current coding unit, an upper coding unit is disposed adjacent and above the current coding unit, and the method comprises performing modified intra planar coding of the current coding unit without using pixel values from the left coding unit and the upper coding unit. The modified intra planar coding also may comprise using the pixel values from a neighboring, outside lower-left pixel disposed adjacent and diagonally outward from a lower-left corner of the coding unit, and a neighboring, outside above-right pixel disposed adjacent and diagonally outward from an upper-right corner of the coding unit.

By another example, the method may comprise modified intra planar coding comprising calculating the prediction value ($Pred_{DC}$(INTRA_PLANAR_MOD)) as:

$$Pred_{DC}(\text{INTRA\_PLANAR\_MOD}) = \frac{(p(N, -1) + p(-1, N) + 1)}{2}$$

where N stands for the width and height of the coding unit, p(N, −1) stands for the pixel value at a neighboring, outside upper-right pixel disposed adjacent and diagonally outward from the upper-right corner of the coding unit, and p(−1, N) stands for the pixel value at a neighboring, outside lower-left pixel disposed adjacent and diagonally outward from the lower-left corner of the coding unit.

The modified intra planar coding may also comprise using the pixel value from a neighboring, outside upper-left pixel disposed adjacent and diagonally outward from an upper-left corner of the coding unit. By one form, the upper-left pixel may be outside of the current coding unit, the left coding unit, and the upper coding unit.

By yet other forms, the coding unit is a current coding unit, a left coding unit is disposed adjacent and to the left of the current unit, an upper coding unit is disposed adjacent and above the current coding unit, and the method comprises modified intra DC coding to form the prediction value and comprises sub-sampling a left column of pixels in the left coding unit or above row of pixels in the upper coding unit or both comprising using at least one and less than all pixel values from the left column, or at least one and less than all pixel values from the above row or both. The modified intra DC coding may be performed without a boundary smoothing calculation to obtain the prediction value, and the sub-sampling comprises using every αth pixel in the left column and above row where α>1. The left column is disposed adjacent the current coding unit in the left coding unit, and the above row is disposed adjacent the current coding unit in the upper coding unit.

In other approaches, the modified intra planar coding comprises using the modified intra DC coding with sub-sampling and using the pixel values of a neighboring, outside upper-right pixel disposed adjacent and diagonally outward from the upper-right corner of the coding unit, and a neighboring, outside lower-left pixel disposed adjacent and diagonally outward from the lower-left corner of the coding, and a neighboring, outside lower-left pixel disposed diagonally outward and adjacent the lower-left corner of the coding unit. Modified intra planar coding may also comprise using the pixel value of at least a neighboring, outside upper-left pixel disposed adjacent and diagonally outward from the upper-left corner of the coding unit.

By some examples, the modified intra DC coding comprises calculating the prediction value ($Pred_{DC}$(INTRA_DC_MOD)) as:

$$Pred_{DC}(\text{INTRA\_DC\_MOD}) = \frac{\sum_{x=0}^{N-1} p(x, -1) + \sum_{y=0}^{N-1} p(-1, y) + N'}{2N'},$$

Where N stands for the Width and height of the coding unit, N' stands for the sub-sampled width or height of the coding unit where $$N' = \frac{N}{\alpha},$$

α is the sub-sample factor, α=2, 3, . . . N, x stands for the horizontal ordinate, y stands for the vertical ordinate, p(x, −1) stands for the values of the above row neighboring pixels at (x, −1) where x=0, α, 2α . . . , x<N−1, p(−1, y) stands for the values of left column neighboring pixels at (−1, y), y=0, α, 2α . . . , y<N−1.

In some other examples, the method comprises providing the option to code the coding unit with (1) intra DC coding using all of the pixels of a left column of pixels in the left coding unit, and using all of the pixel of an above row of pixels in the upper coding unit, (2) intra DMM (depth modeling mode) coding, (3) intra planar coding determining the prediction value for individual pixels within the coding unit, and (4) the modified intra planar coding or the modified intra DC coding or both.

By yet further implementations, the method comprises modified intra planar coding comprising calculating the prediction value ($Pred_{DC}$(INTRA_PLANAR_MOD)) by at least one of:

$$Pred_{DC}(\text{INTRA\_PLANAR\_MOD}) =$$

$$\frac{(N'-1)*\left(\sum_{x=0}^{N-1} p(x,-1) + \sum_{y=0}^{N-1} p(-1,y)\right) + N'*(N'+1)*(p(N,-1)+p(-1,N))+2N'^2}{4N'^2},$$

$$Pred_{DC}(\text{INTRA\_PLANAR\_MOD}) =$$

$$\frac{2(N'-1)*Pred_{DC}(\text{INTRA\_DC}) + (N'+1)*(p(N,-1)+p(-1,N))+2N'}{4N'},$$

$$Pred_{DC}(\text{INTRA\_PLANAR\_MOD}) = \frac{\sum_{x=0}^{N-1} p(x,-1) + \sum_{y=0}^{N-1} p(-1,y) + N'*(p(N,-1)+p(-1,N))+2N'}{4N'},$$

$$Pred_{DC}(\text{INTRA\_PLANAR\_MOD}) = \frac{2Pred_{DC}(\text{INTRA\_DC}) + p(N,-1)+p(-1,N)+2}{4},$$

$$Pred_{DC}(\text{INTRA\_PLANAR\_MOD}) =$$

$$\frac{\sum_{x=0}^{N-1} p(x,-1) + \sum_{y=0}^{N-1} p(-1,y) + \frac{N'}{2}*(p(N,-1)+p(-1,N)+2*p(-1,-1))+2N'}{4N'},$$

and $$Pred_{DC}(\text{INTRA\_PLANAR\_MOD}) = \frac{Pred_{DC}(\text{INTRA\_DC}) + p(N, -1) + p(-1, N) + p(-1, -1) + 2}{4}$$

where N stands for the width and height of the coding unit, N' stands for the sub-sampled width or height of the coding unit, where $$N' = \frac{N}{\alpha},$$

α is the sub-sample factor, α=2, 3, ... N, x stands for the horizontal ordinate, y stands for the vertical ordinate, p(x, −1) stands for the values of above row neighboring pixels at (x, −1), x=0, α, 2α ... x<N−1, p(−1, y) stands for the values of left column neighboring pixels at (−1, y), y=0, α, 2α ..., y<N−1, p(N, −1) stands for the value of the above-right neighboring pixel on the above row outside the coding unit, and disposed adjacent and diagonally outward from the upper-right corner of the coding unit, p(−1, N) stands for the value of the left-bottom neighboring pixel on the left column outside the coding unit and disposed adjacent and diagonally outward from the lower-left corner of the coding unit, p(−1, −1) stands for the value of the left-top neighboring pixel on the left column and above row outside the current coding unit and disposed adjacent and diagonally outward from an upper-left corner of the coding unit, and wherein $Pred_{DC}(\text{INTRA\_DC})$ is a prediction value obtained from the modified intra DC coding.

In another form, a system for 3D video coding comprises at least one display, at least one memory communicatively coupled to the display, at least one processor core communicatively coupled to the display and the memory, and an intra coding module communicatively coupled to the processor core, and configured to perform simplified depth coding by performing modified intra DC coding or modified intra planar coding of at least one coding unit associated with a plurality of pixels and of at least one depth map. The intra coding module is configured to form a prediction value for the at least one coding unit based, at least in part, on pixel values outside of the coding unit on the depth map, and without calculating prediction values for individual pixels within the coding unit.

In different implementations, the coding unit is a current coding unit, a left coding unit is disposed adjacent and to the left of the current coding unit, an upper coding unit is disposed adjacent and above the current coding unit, and the intra coding module is configured to perform modified intra planar coding of the current coding unit without using pixel values from the left coding unit and the upper coding unit. The modified intra planar coding comprises using the pixel values from a neighboring, outside lower-left pixel disposed adjacent and diagonally outward from a lower-left corner of the coding unit, and a neighboring, outside above-right pixel disposed adjacent and diagonally outward from an upper-right corner of the coding unit.

The intra coding module also may be configured to perform modified intra planar coding comprising calculating the prediction value ($Pred_{DC}(\text{INTRA\_PLANAR\_MOD})$) as:

$$Pred_{DC}(\text{INTRA\_PLANAR\_MOD}) = \frac{(p(N, -1) + p(-1, N) + 1)}{2},$$

where N stands for the width and height of the coding unit, p(N, −1) stands for the pixel value at a neighboring, outside upper-right pixel disposed adjacent and diagonally outward from the upper-right corner of the coding unit, and p(−1, N) stands for the pixel value at a neighboring, outside lower-left pixel disposed adjacent and diagonally outward from the lower-left corner of the coding unit. The modified intra planar coding may also comprise using the pixel value from a neighboring, outside upper-left pixel disposed adjacent and diagonally outward from an upper-left corner of the coding unit, and the upper-left pixel is outside of the current coding unit, the left coding unit, and the upper coding unit.

By yet another approach, the coding unit is a current coding unit, a left coding unit is disposed adjacent and to the left of the current unit, an upper coding unit is disposed adjacent and above the current coding unit, and the intra coding module is configured to perform modified intra DC coding to form the prediction value by sub-sampling a left column of pixels in the left coding unit or above row of pixels in the upper coding unit or both comprising using at least one and less than all pixel values from the left column, or at least one and less than all pixel values from the above row or both. The modified intra DC coding may be performed without a boundary smoothing calculation to obtain the prediction value, and the sub-sampling comprises using every αth pixel in the left column and above row where α>1. By other examples, the left column is disposed adjacent the current coding unit in the left coding unit, and wherein the above row is disposed adjacent the current coding unit in the upper coding unit.

The modified intra planar coding may comprise using the modified intra DC coding with sub-sampling and using the pixel values of a neighboring, outside upper-right pixel disposed adjacent and diagonally outward from the upper-right corner of the coding unit, and a neighboring, outside lower-left pixel disposed adjacent and diagonally outward from the lower-left corner of the coding unit, and a neighboring, outside lower-left pixel disposed diagonally outward and adjacent the lower-left corner of the coding unit. The modified intra planar coding also may comprise using the pixel value of at least a neighboring, outside upper-left pixel disposed adjacent and diagonally outward from the upper-left corner of the coding unit.

For other implementations, modified intra DC coding comprises calculating the prediction value ($Pred_{DC}(\text{INTRA\_DC\_MOD})$) as:

$$Pred_{DC}(\text{INTRA\_DC\_MOD}) = \frac{\sum_{x=0}^{N-1} p(x, -1) + \sum_{y=0}^{N-1} p(-1, y) + N'}{2N'},$$

where N stands for the width and height of the coding unit. N' stands for the sub-sampled width or height of the coding unit where $$N' = \frac{N}{\alpha},$$

α is the sub-sample factor, α=2, 3, ... N, x stands for the horizontal ordinate, y stands for the vertical ordinate, p(x, −1) stands for the values of the above row neighboring pixels at (x, −1), where x=0, α, 2α ... x<N−1, p(−1, y)

stands for the values of left column neighboring pixels at (−1, y), y=0, α, 2α . . . , y<N−1.

By some approaches, the intra coding module may be configured to provide the option to code the coding unit with (1) intra DC coding using all of the pixels of a left column of pixels in the left coding unit, and using all of the pixels of in an above row of pixels in the upper coding unit, (2) intra DMM (depth modeling mode) coding, (3) intra planar coding determining the prediction value for individual pixels within the coding unit, and (4) the modified intra planar coding or the modified intra DC coding or both.

The intra coding module may be configured to provide modified intra planar coding comprising calculating the prediction value ($Pred_{DC}$(INTRA_PLANAR_MOD)) by at least one of:

$$Pred_{DC}(\text{INTRA\_PLANAR\_MOD}) = \frac{\left((N'-1)*\left(\sum_{x=0}^{N-1}p(x,-1)+\sum_{y=0}^{N-1}p(-1,y)\right)+\right.}{\left.N'*(N'+1)*(p(N,-1)+p(-1,N))+2N'^2\right)}{4N'^2},$$

$$Pred_{DC}(\text{INTRA\_PLANAR\_MOD}) = \frac{2(N'-1)*Pred_{DC}(\text{INTRA\_DC})+}{(N'+1)*(p(N,-1)+p(-1,N))+2N'}{4N'},$$

$$Pred_{DC}(\text{INTRA\_PLANAR\_MOD}) = \frac{\sum_{x=0}^{N-1}p(x,-1)+\sum_{y=0}^{N-1}p(-1,y)+N'*(p(N,-1)+p(-1,N))+2N'}{4N'},$$

$$Pred_{DC}(\text{INTRA\_PLANAR\_MOD}) = \frac{2Pred_{DC}(\text{INTRA\_DC})+p(N,-1)+p(-1,N)+2}{4},$$

$$Pred_{DC}(\text{INTRA\_PLANAR\_MOD}) = \frac{\left(\sum_{x=0}^{N-1}p(x,-1)+\sum_{y=0}^{N-1}p(-1,y)+\frac{N'}{2}*(p(N,-1)+p(-1,N)+2*p(-1,-1))+2N'\right)}{4N'},$$

and $$Pred_{DC}(\text{INTRA\_PLANAR\_MOD}) = \frac{Pred_{DC}(\text{INTRA\_DC})+p(N,-1)+p(-1,N)+p(-1,-1)+2}{4}$$

where N stands for the width and height of the coding unit, N' stands for the sub-sampled width or height of the coding unit, where $$N' = \frac{N}{\alpha},$$

α is the sub-sample factor, α=2, 3, . . . N, x stands for the horizontal ordinate, y stands for the vertical ordinate, p(x, −1) stands for the values of above row neighboring pixels at (x, −1), x=0, α, 2α . . . x<N−1, p(−1, y) stands for the values of left column neighboring pixels at (−1, y), y=0, α, 2α . . . , y<N−1, p(N, −1) stands for the value of the above-right neighboring pixel on the above row outside the coding unit, and disposed adjacent and diagonally outward from the upper-right corner of the coding unit, p(−1, N) stands for the value of the left-bottom neighboring pixel on the left column outside the coding unit and disposed adjacent and diagonally outward from the lower-left corner of the coding unit, p(−1, −1) stands for the value of the left-top neighboring pixel on the left column and above row outside the current coding unit and disposed adjacent and diagonally outward from an upper-left corner of the coding unit, and wherein $Pred_{DC}$(INTRA_DC) is a prediction value obtained from the modified intra DC coding.

By yet a different approach, a non-transitory computer readable medium has instructions, when executed by a computer, that result in: simplified depth coding by performing modified intra DC coding or modified intra planar coding of at least one coding unit associated with a plurality of pixels and of at least one depth map. The instructions result in forming a prediction value for the at least one coding unit based, at least in part, on pixel values outside of the coding unit on the depth map, and without calculating prediction values for individual pixels within the coding unit.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed:

1. A computer implemented method for 3D video coding comprising:
    simplified depth coding by performing modified intra DC coding or modified intra planar coding of at least one coding unit associated with a plurality of pixels and of at least one depth map, and comprising forming a prediction value of the at least one coding unit based, at least in part, on pixel values outside of the coding unit on the depth map, and without calculating prediction values of individual pixels within the coding unit wherein the coding unit is a current coding unit, wherein a left coding unit is disposed adjacent and to the left of the current unit, wherein an upper coding unit is disposed adjacent and above the current coding unit, and the method comprising modified intra DC coding to form the prediction value comprising:
    sub-sampling a left column of pixels in the left coding unit or above row of pixels in the upper coding unit or both comprising using at least one and less than all pixel values from the left column, or at least one and less than all pixel values from the above row or both.

2. The method of claim 1 wherein the modified intra planar coding comprises using the pixel values from a neighboring, outside lower-left pixel disposed adjacent and diagonally outward from a lower-left corner of the coding unit, and a neighboring, outside above-right pixel disposed adjacent and diagonally outward from an upper-right corner of the coding unit.

3. The method of claim 1 comprising modified intra planar coding comprising calculating the prediction value ($\text{Pred}_{DC}(\text{INTRA\_PLANAR\_MOD})$) as:

$$\text{Pred}_{DC}(\text{INTRA\_PLANAR\_MOD}) = \frac{(p(N, -1) + p(-1, N) + 1)}{2},$$

wherein N stands for the width and height of the coding unit, $p(N, -1)$ stands for the pixel value at a neighboring, outside upper-right pixel disposed adjacent and diagonally outward from the upper-right corner of the coding unit, and $p(-1, N)$ stands for the pixel value at a neighboring, outside lower-left pixel disposed adjacent and diagonally outward from the lower-left corner of the coding unit.

4. The method of claim 1 wherein the modified intra planar coding comprises using the pixel value from a neighboring, outside upper-left pixel disposed adjacent and diagonally outward from an upper-left corner of the coding unit.

5. The method of claim 4 wherein the upper-left pixel is outside of the current coding unit, the left coding unit, and the upper coding unit.

6. The method of claim 5 wherein modified intra planar coding comprises using pixel values in a left column of pixels adjacent the current coding unit in the left coding unit, and an above row of pixels adjacent the current coding unit in the upper coding unit.

7. The method of claim 1 wherein modified intra planar coding comprises using the modified intra DC coding with sub-sampling and using the pixel values of a neighboring, outside upper-right pixel disposed adjacent and diagonally outward from the upper-right corner of the coding unit, and a neighboring, outside lower-left pixel disposed adjacent and diagonally outward from the lower-left corner of the coding unit.

8. The method of claim 1 wherein modified intra planar coding comprises using the modified intra DC coding with sub-sampling and using the pixel value of at least a neighboring, outside upper-left pixel disposed adjacent and diagonally outward from the upper-left corner of the coding unit.

9. The method of claim 1, wherein modified intra DC coding comprises calculating the prediction value ($\text{Pred}_{DC}$ (INTRA_DC_MOD)) as:

$$\text{Pred}_{DC}(\text{INTRA\_DC\_MOD}) = \frac{\sum_{x=0}^{N-1} p(x, -1) + \sum_{y=0}^{N-1} p(-1, y) + N'}{2N'}$$

wherein N stands for the width and height of the coding unit, N' stands for the sub-sampled width or height of the coding unit where $$N' = \frac{N}{\alpha},$$

α is the sub-sample factor, α=2, 3, . . . N, x stands for the horizontal ordinate, y stands for the vertical ordinate, $p(x, -1)$ stands for the values of the above row neighboring pixels at $(x, -1)$, where x=0, α, 2α . . . , x<N−1, $p(-1, y)$ stands for the values of left column neighboring pixels at $(-1, y)$, y=0, α, 2α . . . , y<N−1.

10. The method of claim 1, comprising:
wherein the coding unit is a current coding unit, wherein a left coding unit is disposed adjacent and to the left of the current unit, wherein an upper coding unit is disposed adjacent and above the current coding unit, and the method comprising providing the option to code the coding unit with:
intra DC coding using all of the pixels of a left column of pixels in the left coding unit, and using all of the pixels of an above row of pixels in the upper coding unit,
intra DMM (depth modeling mode) coding,
intra planar coding determining the prediction value for individual pixels within the coding unit, and
the modified intra planar coding or the modified intra DC coding or both.

11. The method of claim 1, comprising modified intra planar coding comprising calculating the prediction value ($\text{Pred}_{DC}(\text{INTRA\_PLANAR\_MOD})$) by at least one of:

$$\text{Pred}_{DC}(\text{INTRA\_PLANAR\_MOD}) = \frac{\left( (N'-1) * \left( \sum_{x=0}^{N-1} p(x, -1) + \sum_{y=0}^{N-1} p(-1, y) \right) + \right)}{4N'^2},$$

$$\text{Pred}_{DC}(\text{INTRA\_PLANAR\_MOD}) = \frac{2(N'-1) * \text{Pred}_{DC}(\text{INTRA\_DC}) + (N'+1) * (p(N, -1) + p(-1, N)) + 2N'}{4N'},$$

$$\text{Pred}_{DC}(\text{INTRA\_PLANAR\_MOD}) = \frac{\sum_{x=0}^{N-1} p(x, -1) + \sum_{y=0}^{N-1} p(-1, y) + N' * (p(N, -1) + p(-1, N)) + 2N'}{4N'},$$

and $$\text{Pred}_{DC}(\text{INTRA\_PLANAR\_MOD}) = \frac{2\text{Pred}_{DC}(\text{INTRA\_DC}) + p(N, -1) + p(-1, N) + 2}{4}$$

wherein N stands for the width and height of the coding unit, N' stands for the sub-sampled width or height of the coding unit, where $$N' = \frac{N}{\alpha},$$

α is the sub sample factor, α=2, 3, . . . N, x stands for the horizontal ordinate, y stands for the vertical ordinate, $p(x, -1)$ stands for the values of above row neighboring pixels at $(x, -1)$, x=0, α, 2α . . . x<N−1, $p(-1, y)$ stands for the values of left column neighboring pixels at $(-1, y)$, y=0, α, 2α . . . , y<N−1, $p(N, -1)$ stands for the value of the above-right neighboring pixel on the above row outside the coding unit, and disposed adjacent and diagonally outward from the upper-right corner of the coding unit, $p(-1, N)$ stands for the value of the left-bottom neighboring pixel on the left column outside the coding unit and disposed adjacent and diagonally outward from the lower-left corner of the coding unit, and wherein $Pred_{DC}(INTRA\_DC)$ is a prediction value obtained from the modified intra DC coding.

12. The method of claim 1, comprising modified intra planar coding comprising calculating the prediction value $(Pred_{DC}(INTRA\_PLANAR\_MOD))$ by at least one of:

$$Pred_{DC}(INTRA\_PLANAR\_MOD) = \frac{\left( \sum_{x=0}^{N-1} p(x,-1) + \sum_{y=0}^{N-1} p(-1,y) + \frac{N'}{2}*(p(N,-1)+p(-1,N)+2*p(-1,-1))+2N' \right)}{4N'}$$

and $$Pred_{DC}(INTRA\_PLANAR\_MOD) = \frac{Pred_{DC}(INTRA\_DC) + p(N,-1) + p(-1,N) + p(-1,-1) + 2}{4},$$

wherein N stands for the width and height of the coding unit, N' stands for the sub-sampled width or height of the coding unit, where $$N' = \frac{N}{\alpha},$$

α is the sub-sample factor, α=2, 3, . . . N, x stands for the horizontal ordinate, y stands for the vertical ordinate, p(x, −1) stands for the values of above row neighboring pixels at (x, −1), x=0, α, 2α . . . x<N−1, p(−1, y) stands for the values of left column neighboring pixels at (−1, y), y=0, α, 2α . . . , y<N−1, p(N, −1) stands for the value of the above-right neighboring pixel on the above row outside the coding unit, and disposed adjacent and diagonally outward from the upper-right corner of the coding unit, p(−1, N) stands for the value of the left-bottom neighboring pixel on the left column outside the coding unit and disposed adjacent and diagonally outward from the lower-left corner of the coding unit, p(−1, −1) stands for the value of the left-top neighboring pixel on the left column and above row outside the current coding unit and disposed adjacent and diagonally outward from an upper-left corner of the coding unit, and wherein $Pred_{DC}(INTRA\_DC)$ is a prediction value obtained from the modified intra DC coding.

13. The method of claim 1,
wherein the modified intra planar coding comprises using the pixel values from a neighboring, outside lower-left pixel disposed adjacent and diagonally outward from a lower-left corner of the coding unit, and a neighboring, outside above-right pixel disposed adjacent and diagonally outward from an upper-right corner of the coding unit;
the method comprising modified intra planar coding comprising calculating the prediction value $(Pred_{DC}(INTRA\_PLANAR\_MOD))$ as:

$$Pred_{DC}(INTRA\_PLANAR\_MOD) = \frac{(p(N,-1) + p(-1,N) + 1)}{2}$$

wherein N stands for the width and height of the coding unit, p(N, −1) stands for the pixel value at a neighboring, outside upper-right pixel disposed adjacent and diagonally outward from the upper-right corner of the coding unit, and p(−1, N) stands for the pixel value at a neighboring, outside lower-left pixel disposed adjacent and diagonally outward from the lower-left corner of the coding unit;
wherein the modified intra planar coding comprises using the pixel value from a neighboring, outside upper-left pixel disposed adjacent and diagonally outward from an upper-left corner of the coding unit; and
wherein the upper-left pixel is outside of the current coding unit, the left coding unit, and the upper coding unit.

14. The method of claim 1
wherein modified intra DC coding is performed without a boundary smoothing calculation to obtain the prediction value;
wherein sub-sampling comprises using every αth pixel in the left column and above row where a>1;
wherein the left column is disposed adjacent the current coding unit in the left coding unit, and wherein the above row is disposed adjacent the current coding unit in the upper coding unit;
wherein modified intra planar coding comprises using the modified intra DC coding with sub-sampling and using the pixel values of a neighboring, outside upper-right pixel disposed adjacent and diagonally outward from the upper-right corner of the coding unit, and a neighboring, outside lower-left pixel disposed adjacent and diagonally outward from the lower-left corner of the coding, and a neighboring, outside lower-left pixel disposed diagonally outward and adjacent the lower-left corner of the coding unit;
wherein modified intra planar coding comprises using the pixel value of at least a neighboring, outside upper-left pixel disposed adjacent and diagonally outward from the upper-left corner of the coding unit;
wherein modified intra DC coding comprises calculating the prediction value $Pred_{DC}(INTRA\_PLANAR\_MOD)$ as:

$$Pred_{DC}(INTRA\_DC\_MOD) = \frac{\sum_{x=0}^{N-1} p(x,-1) + \sum_{y=0}^{N-1} p(-1,y) + N'}{2N'}$$

wherein N stands for the width and height of the coding unit, N' stands for the sub-sampled width or height of the coding unit where $$N' = \frac{N}{\alpha},$$

α is the sub-sample factor, α=2, 3, . . . N, x stands for the horizontal ordinate, y stands for the vertical ordinate, p(x, −1) stands for the values of the above row neighboring pixels at (x, −1), where x=0, α, 2α . . . , x<N−1, p(−1, y) stands for the values of left column neighboring pixels at (−1, y), y=0, α, 2α . . . , y<N−1;
comprising providing the option to code the coding unit with:
intra DC coding using all of the pixels of a left column of pixels in the left coding unit, and using all of the pixels of in an above row of pixels in the upper coding unit, intra DMM (depth modeling mode) coding, intra planar coding determining the prediction value for individual pixels within the coding unit, and the modified intra planar coding or the modified intra DC coding or both; and comprising modified intra planar coding comprising calculating the prediction value $Pred_{DC}(INTRA\_PLANAR\_MOD)$ by at least one of:

$$Pred_{DC}(INTRA\_PLANAR\_MOD) = \frac{\left((N'-1)*\left(\sum_{x=0}^{N-1} p(x,-1) + \sum_{y=0}^{N-1} p(-1,y)\right) + N'*(N'+1)*(p(N,-1)+p(-1,N)) + 2N'^2\right)}{4N'^2},$$

$$Pred_{DC}(INTRA\_PLANAR\_MOD) = \frac{2(N'-1)*Pred_{DC}(INTRA\_DC) + (N'+1)*(p(N,-1)+p(-1,N)) + 2N'}{4N'},$$

$$Pred_{DC}(INTRA\_PLANAR\_MOD) = \frac{\sum_{x=0}^{N-1} p(x,-1) + \sum_{y=0}^{N-1} p(-1,y) + N' * (p(N,-1)+p(-1,N)) + 2N'}{4N'},$$

$$Pred_{DC}(INTRA\_PLANAR\_MOD) = \frac{2Pred_{DC}(INTRA\_DC) + p(N,-1) + p(-1,N) + 2}{4},$$

$$Pred_{DC}(INTRA\_PLANAR\_MOD) = \frac{\left(\sum_{x=0}^{N-1} p(x,-1) + \sum_{y=0}^{N-1} p(-1,y) + \frac{N'}{2}*(p(N,-1)+p(-1,N)+2*p(-1,-1)) + 2N'\right)}{4N'},$$

and $$Pred_{DC}(INTRA\_PLANAR\_MOD) = \frac{Pred_{DC}(INTRA\_DC) + \frac{p(N,-1)+p(-1,N)+p(-1,-1)+2}{4}}{}$$

wherein N stands for the width and height of the coding unit, N' stands for the sub-sampled width or height of the coding unit, where $$N' = \frac{N}{\alpha}$$

α is the sub-sample factor, α=2, 3, . . . N, x stands for the horizontal ordinate, y stands for the vertical ordinate, p(x, −1) stands for the values of above row neighboring pixels at ((x, −1)), x=0, α, 2α . . . x<N−1, p(−1, y) stands for the values of left column neighboring pixels at (−1, y), y=0, α, 2α . . . , y<N−1, p(N, −1) stands for the value of the above-right neighboring pixel on the above row outside the coding unit, and disposed adjacent and diagonally outward from the upper-right corner of the coding unit, p(−1, N) stands for the value of the left-bottom neighboring pixel on the left column outside the coding unit and disposed adjacent and diagonally outward from the lower-left corner of the coding unit, p(−1, −1) stands for the value of the left-top neighboring pixel on the left column and above row outside the current coding unit and disposed adjacent and diagonally outward from an upper-left corner of the coding unit, and wherein $Pred_{DC}(INTRA\_DC)$ is a prediction value obtained from the modified intra DC coding.

15. A system for 3D video coding comprising:

at least one display;

at least one memory communicatively coupled to the display;

at least one processor core communicatively coupled to the display and the memory; and an intra coding module communicatively coupled to the processor core, and configured to perform simplified depth coding by performing modified intra DC coding or modified intra planar coding of at least one coding unit associated with a plurality of pixels and of at least one depth map, and the intra coding module being configured to form a prediction value for the at least one coding unit based, at least in part, on pixel values outside of the coding unit on the depth map, and without calculating prediction values for individual pixels within the coding unit, wherein the coding unit is a current coding unit, wherein a left coding unit is disposed adjacent and to the left of the current unit, wherein an upper coding unit is disposed adjacent and above the current coding unit, and the method comprising providing the option to code the coding unit with:

intra DC coding using all of the pixels of a left column of pixels in the left coding unit, and using all of the pixels of an above row of pixels in the upper coding unit, intra DMM (depth modeling mode) coding, intra planar coding determining the prediction value for individual pixels within the coding unit, and the modified intra planar coding or the modified intra DC coding or both.

16. The system of claim 15, wherein the coding unit is a current coding unit, wherein a left coding unit is disposed adjacent and to the left of the current coding unit, wherein an upper coding unit is disposed adjacent and above the current coding unit, and the intra coding module being configured to perform modified intra planar coding of the current coding unit without using pixel values from the left coding unit and the upper coding unit;

wherein the modified intra planar coding comprises using the pixel values from a neighboring, outside lower-left pixel disposed adjacent and diagonally outward from a lower-left corner of the coding unit, and a neighboring, outside above-right pixel disposed adjacent and diagonally outward from an upper-right corner of the coding unit;

the intra coding module being configured to perform modified intra planar coding comprising calculating the prediction value ($Pred_{DC}$(INTRA_PLANAR_MOD) as:

$$Pred_{DC}(INTRA\_PLANAR\_MOD) = \frac{(p(N,-1)+p(-1,N)+1)}{2},$$

wherein N stands for the width and height of the coding unit, p(N, −1) stands for the pixel value at a neighboring, outside upper-right pixel disposed adjacent and diagonally outward from the upper-right corner of the coding unit, and p(−1, N) stands for the pixel value at a neighboring, outside lower-left pixel disposed adjacent and diagonally outward from the lower-left corner of the coding unit;

wherein the modified intra planar coding comprises using the pixel value from a neighboring, outside upper-left pixel disposed adjacent and diagonally outward from an upper-left corner of the coding unit; and wherein the upper-left pixel is outside of the current coding unit, the left coding unit, and the upper coding unit.

17. The system of claim 15 wherein the coding unit is a current coding unit, wherein a left coding unit is disposed adjacent and to the left of the current unit, wherein an upper coding unit is disposed adjacent and above the current coding unit, and the intra coding module being configured to perform modified intra DC coding to form the prediction value comprising:

sub-sampling the left column or above row or both comprising using at least one and less than all pixel values from a left column of pixels in the left coding unit, or at least one and less than all pixel values from an above row of pixels in the upper coding unit or both;

wherein modified intra DC coding is performed without a boundary smoothing calculation to obtain the prediction value;

wherein sub-sampling comprises using every ath pixel in the left column and above row where α>1;

wherein the left column is disposed adjacent the current coding unit in the left coding unit, and wherein the above row is disposed adjacent the current coding unit in the upper coding unit;

wherein modified intra planar coding comprises using the modified intra DC coding with sub-sampling and using the pixel values of a neighboring, outside upper-right pixel disposed adjacent and diagonally outward from the upper-right corner of the coding unit, and a neighboring, outside lower-left pixel disposed adjacent and diagonally outward from the lower-left corner of the coding, and a neighboring, outside lower-left pixel disposed diagonally outward and adjacent the lower-left corner of the coding unit;

wherein modified intra planar coding comprises using the pixel value of at least a neighboring, outside upper-left pixel disposed adjacent and diagonally outward from the upper-left corner of the coding unit;

wherein modified intra DC coding comprises calculating the prediction value ($Pred_{DC}$(INTRA_PLANAR_MOD) as:

$$Pred_{DC}(\text{INTRA\_DC\_MOD}) = \frac{\sum_{x=0}^{N-1} p(x,-1) + \sum_{y=0}^{N-1} p(-1,y) + N'}{2N'}$$

wherein N stands for the width and height of the coding unit, N' stands for the sub-sampled width or height of the coding unit where $$N' = \frac{N}{\alpha},$$

α is the sub-sample factor, α=2, 3, . . . N, x stands for the horizontal ordinate, y stands for the vertical ordinate, p((x, −1)) stands for the values of the above row neighboring pixels at (x, −1), where x=0, α, 2α . . . , x<N−1, p(−1, y) stands for the values of left column neighboring pixels at (−1, y), y=0, α, 2α . . . , y<N−1;

the intra coding module being configured to provide modified intra planar coding comprising calculating the prediction value ($Pred_{DC}$(INTRA_PLANAR_MOD) by at least one of:

$Pred_{DC}$(INTRA_PLANAR_MOD) =

$$\frac{(N'-1)*\left(\sum_{x=0}^{N-1} p(x,-1) + \sum_{y=0}^{N-1} p(-1,y)\right) + N'*(N'+1)*(p(N,-1)+p(-1,N)) + 2N'^2}{4N'^2},$$

$Pred_{DC}$(INTRA_PLANAR_MOD) =

$$\frac{2(N'-1)*Pred_{DC}(\text{INTRA\_DC}) + (N'+1)*(p(N,-1)+p(-1,N)) + 2N'}{4N'},$$

$Pred_{DC}$(INTRA_PLANAR_MOD) =

$$\frac{\sum_{x=0}^{N-1} p(x,-1) + \sum_{y=0}^{N-1} p(-1,y) + N'*(p(N,-1)+p(-1,N)) + 2N'}{4N'},$$

$Pred_{DC}$(INTRA_PLANAR_MOD) =

$$\frac{2Pred_{DC}(\text{INTRA\_DC}) + p(N,-1) + p(-1,N) + 2}{4},$$

$Pred_{DC}$(INTRA_PLANAR_MOD) =

$$\frac{\left(\sum_{x=0}^{N-1} p(x,-1) + \sum_{y=0}^{N-1} p(-1,y) + \frac{N'}{2}*(p(N,-1)+p(-1,N)+2*p(-1,-1)) + 2N'\right)}{4N'},$$

and $Pred_{DC}$(INTRA_PLANAR_MOD) =

$$\frac{Pred_{DC}(\text{INTRA\_DC}) + p(N,-1) + p(-1,N) + p(-1,-1) + 2}{4}$$

wherein N stands for the width and height of the coding unit, N' stands for the sub-sampled width or height of the coding unit, where $$N' = \frac{N}{\alpha},$$

α is the sub-sample factor, α=2, 3, . . . N, x stands for the horizontal ordinate, y stands for the vertical ordinate, p((x, −1)) stands for the values of above row neighboring pixels at ((x, −1)), x=0, α, 2α . . . x<N−1, p(−1, y) stands for the values of left column neighboring pixels at (−1, y), y=0, α, 2α . . . , y<N−1, p(N, −1) stands for the value of the above-right neighboring pixel on the above row outside the coding unit, and disposed adjacent and diagonally outward from the upper-right corner of the coding unit, p(−1, N) stands for the value of the left-bottom neighboring pixel on the left column outside the coding unit and disposed adjacent and diagonally outward from the lower-left corner of the coding unit, p(−1, −1) stands for the value of the left-top neighboring pixel on the left column and above row outside the current coding unit and disposed adjacent and diagonally outward from an upper-left corner of the coding unit, and wherein $Pred_{DC}(INTRA\_DC)$ is a prediction value obtained from the modified intra DC coding.

18. A non-transitory computer readable medium having instructions, when executed by a computer, result in:
simplified depth coding by performing modified intra DC coding or modified intra planar coding of at least one coding unit associated with a plurality of pixels and of at least one depth map, and comprising forming a prediction value for the at least one coding unit based, at least in part, on pixel values outside of the coding unit on the depth map, and without calculating prediction values for individual pixels within the coding unit, modified intra planar coding comprising calculating the prediction value ($Pred_{DC}(INTRA\_PLANAR\_MOD)$) as:

$$Pred_{DC}(INTRA\_PLANAR\_MOD) = \frac{(p(N, -1) + p(-1, N) + 1)}{2},$$

wherein N stands for the width and height of the coding unit, p(N, −1) stands for the pixel value at a neighboring, outside upper-right pixel disposed adjacent and diagonally outward from the upper-right corner of the coding unit, and p(−1, N) stands for the pixel value at a neighboring, outside lower-left pixel disposed adjacent and diagonally outward from the lower-left corner of the coding unit.

* * * * *